US010323164B2

(12) United States Patent
Nakatani et al.

(10) Patent No.: US 10,323,164 B2
(45) Date of Patent: Jun. 18, 2019

(54) HYDROGENATED BLOCK COPOLYMER COMPOSITION AND PRESSURE-SENSITIVE ADHESIVE COMPOSITION

(71) Applicant: Asahi Kasei Kabushiki Kaisha, Tokyo (JP)

(72) Inventors: Kosuke Nakatani, Tokyo (JP); Takahiro Hisasue, Tokyo (JP); Yoshifumi Araki, Tokyo (JP); Tadashi Matsushita, Tokyo (JP); Kenta Shibuya, Tokyo (JP); Takeshi Aoyagi, Tokyo (JP); Ippei Kameda, Tokyo (JP); Atsushi Yasumoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 15 days.

(21) Appl. No.: 15/312,233

(22) PCT Filed: May 12, 2015

(86) PCT No.: PCT/JP2015/063690

§ 371 (c)(1),
(2) Date: Nov. 18, 2016

(87) PCT Pub. No.: WO2015/178259

PCT Pub. Date: Nov. 26, 2015

(65) Prior Publication Data

US 2017/0088757 A1 Mar. 30, 2017

(30) Foreign Application Priority Data

May 19, 2014 (JP) ................................ 2014-103809

(51) Int. Cl.

| | |
|---|---|
| ***C08L 53/02*** | (2006.01) |
| ***C09J 153/02*** | (2006.01) |
| ***C09J 11/06*** | (2006.01) |
| ***C09J 107/00*** | (2006.01) |
| ***C09J 109/00*** | (2006.01) |
| ***C08F 8/04*** | (2006.01) |
| ***C09J 11/08*** | (2006.01) |
| ***C08F 297/04*** | (2006.01) |
| ***C08L 7/00*** | (2006.01) |
| ***C08L 9/00*** | (2006.01) |

(52) U.S. Cl.

CPC ............. *C09J 153/025* (2013.01); *C08F 8/04* (2013.01); *C08F 297/044* (2013.01); *C08L 7/00* (2013.01); *C08L 9/00* (2013.01); *C08L 53/02* (2013.01); *C08L 53/025* (2013.01); *C09J 11/06* (2013.01); *C09J 11/08* (2013.01); *C09J 107/00* (2013.01); *C09J 109/00* (2013.01); *C09J 153/02* (2013.01); *C08L 2205/02* (2013.01); *C08L 2205/025* (2013.01)

(58) Field of Classification Search

CPC ..... C09J 153/02; C09J 153/025; C08L 53/02; C08L 53/025; C08L 2205/02; C08L 2205/025

See application file for complete search history.

(56) References Cited

U.S. PATENT DOCUMENTS

| | | | |
|---|---|---|---|
| 6,451,964 B1 | 9/2002 | Hakamaya et al. | |
| 2002/0147274 A1 | 10/2002 | Sasagawa et al. | |
| 2010/0015442 A1 | 1/2010 | Shimoura et al. | |
| 2010/0239802 A1 | 9/2010 | Kuwahara et al. | |
| 2015/0175855 A1 | 6/2015 | Nakajima et al. | |
| 2016/0333235 A1* | 11/2016 | Nakatani | C09J 153/02 |

FOREIGN PATENT DOCUMENTS

| | | | |
|---|---|---|---|
| EP | 3098264 | A1 | 11/2016 |
| JP | S61-278578 | A | 12/1986 |
| JP | S63-248817 | A | 10/1988 |
| JP | H05-098130 | A | 4/1993 |
| JP | 2009-114308 | A | 5/2009 |
| JP | 2009-114309 | A | 5/2009 |
| JP | 2010-106200 | A | 5/2010 |
| KR | 2008-0113442 | A | 12/2008 |
| SG | 189956 | A1 | 6/2013 |
| TW | 201226504 | A | 7/2012 |
| TW | 201410818 | A | 3/2014 |
| WO | 2001/030859 | A1 | 5/2001 |
| WO | 2001/085818 | A1 | 11/2001 |
| WO | 2009/031625 | A1 | 3/2009 |
| WO | 2012/056939 | A1 | 5/2012 |

OTHER PUBLICATIONS

International Preliminary Report on Patentability and Written Opinion issued in corresponding International Patent Application No. PCT/JP2015/063690 dated Nov. 22, 2016.

European Search Report issued in corresponding European Patent Application No. 15796850.4 dated Apr. 4, 2017.

International Search Report issued in corresponding International Patent Application No. PCT/JP2015/063690 dated Aug. 18, 2015.

* cited by examiner

*Primary Examiner* — Jeffrey C Mullis

(74) *Attorney, Agent, or Firm* — Morgan, Lewis & Bockius LLP

(57) ABSTRACT

A hydrogenated block copolymer composition, comprising:

a component (A) comprising at least one polymer block comprising a vinyl aromatic hydrocarbon as a primary component and at least one polymer block comprising a conjugated diene compound as a primary component and having a weight-average molecular weight of 30,000 or higher and 500,000 or lower, and a component (B) comprising at least two polymer blocks comprising a vinyl aromatic hydrocarbon and at least one polymer block comprising a conjugated diene compound as a primary component and having a weight-average molecular weight of 50,000 or higher and 1,000,000 or lower, wherein the composition satisfies predetermined requirements.

20 Claims, No Drawings

HYDROGENATED BLOCK COPOLYMER COMPOSITION AND PRESSURE-SENSITIVE ADHESIVE COMPOSITION

TECHNICAL FIELD

The present invention relates to a hydrogenated block copolymer composition and a pressure-sensitive adhesive composition using the same.

BACKGROUND ART

In recent years, from the viewpoints of energy saving, resource saving, environmental load reduction and the like, there have been broadly utilized hot melt pressure-sensitive adhesives; and as base polymers for the hot melt pressure-sensitive adhesives, there are broadly used vinyl aromatic monomer-conjugated diene monomer-based block copolymers (for example, SBS; styrene-butadiene-styrene block copolymers and the like). Pressure-sensitive adhesive compositions obtained by using these block copolymers, however, are insufficient in the balance among holding power, tack and adhesive power, and these have been desired to be improved.

As improving methods, for example, Patent Literature 1 discloses a pressure-sensitive adhesive composition composed of a triblock copolymer and a diblock copolymer. Further, Patent Literature 2 discloses a pressure-sensitive adhesive composition composed of a block copolymer obtained by coupling with a specific bifunctional coupling agent (specific dihalogen compound). Furthermore, Patent Literature 3 discloses a pressure-sensitive adhesive composition composed of a block copolymer obtained by hydrogen-adding (hereinafter also simply referred to as "hydrogenating"), in a specific proportion, a block copolymer of a vinyl aromatic monomer and a conjugated diene monomer.

CITATION LIST

Patent Literature

Patent Literature 1: Japanese Patent Laid-Open No. 61-278578

Patent Literature 2: Japanese Patent Laid-Open No. 63-248817

Patent Literature 3: Japanese Patent Laid-Open No. 05-98130

SUMMARY OF INVENTION

Technical Problem

Also in technologies conventionally proposed as described above, however, it cannot be said that the balance of holding power, tack and adhesive power is sufficiently improved, and, in particular, a further improvement of tack is desired. Moreover, the balance between these pressure-sensitive adhesive properties and the texture of a pressure-sensitive adhesive (conformability to irregularities) is also insufficient.

The present invention has been achieved in consideration of the above-mentioned problems, and has an object to provide a hydrogenated block copolymer composition that has excellent pressure-sensitive adhesive properties, i.e., holding power, tack and adhesive power, in particular, excellent tack, and, when formed into a pressure-sensitive adhesive composition, is capable of demonstrating excellent physical properties with respect to pressure-sensitive adhesive properties and the texture of a pressure-sensitive adhesive as well as an excellent balance of such properties, and a pressure-sensitive adhesive composition comprising the hydrogenated block copolymer composition.

Solution to Problem

As a result of exhaustive studies to solve the above conventional problems, the present inventors have found that a hydrogenated block copolymer composition having a specific structure can solve the above-mentioned conventional technical problems and, moreover, found that a pressure-sensitive adhesive composition comprising the hydrogenated block copolymer composition and a tackifier in respective predetermined amounts can also solve the above-mentioned conventional technical problems, and this finding has led to the completion of the present invention.

That is, the present invention is as follows.

Embodiment 1

A hydrogenated block copolymer composition, comprising:

a component (A) comprising at least one polymer block comprising a vinyl aromatic hydrocarbon as a primary component and at least one polymer block comprising a conjugated diene compound as a primary component, and having a weight-average molecular weight of 30,000 or higher and 500,000 or lower, and a component (B) comprising at least two polymer blocks comprising a vinyl aromatic hydrocarbon as a primary component and at least one polymer block comprising a conjugated diene compound as a primary component, and having a weight-average molecular weight of 50,000 or higher and 1,000,000 or lower;

wherein the composition satisfies requirements (a) to (c) below:

(a) a total degree of hydrogenation H (%) of unsaturated double bonds based on the conjugated diene compound is 5 to 90%;

(b) a maximum value of a loss factor tan δ at from −100° C. to 0° C. is 0.4 to 4.0; and (c) a ratio between the weight-average molecular weight of the component (A) and the weight-average molecular weight of the component (B) (the weight-average molecular weight of the component (B)/the weight-average molecular weight of the component (A)) is from 1.3 to 10.

Embodiment 2

The hydrogenated block copolymer composition according to Embodiment 1, wherein a content of the component (A) is 20 mass % or more and 90 mass % or less, and the content of the component (B) is 10 mass % or more and 80 mass % or less.

Embodiment 3

The hydrogenated block copolymer composition according to Embodiment 1 or 2, wherein an SP value is 17.2 $(MPa)^{1/2}$ or higher and 17.7 $(MPa)^{1/2}$ or lower.

Embodiment 4

The hydrogenated block copolymer composition according to any of Embodiments 1 to 3, wherein an SP value of the polymer block comprising a conjugated diene compound as a primary component is 16.8 $(MPa)^{1/2}$ or higher and 17.5 $(MPa)^{1/2}$ or lower.

Embodiment 5

The hydrogenated block copolymer composition according to any of Embodiments 1 to 4, wherein the weight-average molecular weight of the component (B) is 140,000 or higher and 600,000 or lower.

Embodiment 6

The hydrogenated block copolymer composition according to any of Embodiments 1 to 5, wherein the component (B) comprises two polymer blocks comprising a vinyl aromatic hydrocarbon as a primary component and at least one polymer block comprising a conjugated diene compound as a primary component.

Embodiment 7

The hydrogenated block copolymer composition according to any of Embodiments 1 to 6, wherein the weight-average molecular weight of the component (B) is 200,000 or higher and 600,000 or lower.

Embodiment 8

The hydrogenated block copolymer composition according to any of Embodiments 1 to 7, wherein the conjugated diene compound is butadiene.

Embodiment 9

The hydrogenated block copolymer composition according to any of Embodiments 1 to 8, wherein a content of a vinyl aromatic hydrocarbon monomer unit in the hydrogenated block copolymer composition is 5 mass % or higher and lower than 35 mass %.

Embodiment 10

The hydrogenated block copolymer composition according to any one of Embodiments 1 to 9, wherein a content of a vinyl aromatic hydrocarbon monomer unit in the hydrogenated block copolymer composition is 5 mass % or higher and lower than 20 mass %.

Embodiment 11

The hydrogenated block copolymer composition according to any of Embodiments 1 to 10, wherein the maximum value of the loss factor tan δ is from 0.7 to 1.6.

Embodiment 12

The hydrogenated block copolymer composition according to any of Embodiments 1 to 11, wherein the maximum value of the loss factor tan δ is from 0.9 to 1.6.

Embodiment 13

The hydrogenated block copolymer composition according to any of Embodiments 1 to 12, wherein a temperature at which the loss factor tan S has the maximum value is −75° C. or higher and −50° C. or lower.

Embodiment 14

The hydrogenated block copolymer composition according to any of Embodiments 1 to 13, wherein the weight-average molecular weight of the component (A) is 70,000 or higher and 300,000 or lower.

Embodiment 15

A pressure-sensitive adhesive composition comprising the hydrogenated block copolymer composition according to any of Embodiments 1 to 14, and further comprising with respect to total 100 parts by mass of polymers contained in the pressure-sensitive adhesive composition:

from 20 to 500 parts by mass of a tackifier, and from 0 to 300 parts by mass of a softener.

Embodiment 16

The pressure-sensitive adhesive composition according to Embodiment 15, further comprising a vinyl aromatic elastomer.

Embodiment 17

The pressure-sensitive adhesive composition according to Embodiment 16, wherein the vinyl aromatic elastomer comprises at least one polymer block comprising a vinyl aromatic hydrocarbon as a primary component and at least one polymer block comprising a conjugated diene compound as a primary component, a maximum value of a loss factor tan δ at −100° C. to 0° C. is lower than 0.4, and a degree of hydrogenation H (%) of unsaturated double bonds based on the conjugated diene compound is from 5 to 90%.

Embodiment 18

The pressure-sensitive adhesive composition according to any of Embodiments 15 to 17, further comprising a conjugated diene-based synthetic rubber.

Embodiment 19

The pressure-sensitive adhesive composition according to any one of Embodiments 15 to 18, further comprising a natural rubber.

Advantageous Effects of Invention

The present invention can provide a hydrogenated block copolymer composition that has excellent holding power, tack and adhesive power, in particular, excellent tack, and, when formed into a pressure-sensitive adhesive composition, is capable of demonstrating excellent physical properties with respect to pressure-sensitive adhesive properties and the texture of a pressure-sensitive adhesive as well as an excellent balance of such properties, and a pressure-sensitive adhesive composition comprising the hydrogenated block copolymer composition.

DESCRIPTION OF EMBODIMENT

Hereinafter, an embodiment (hereinafter, referred to as "the present embodiment") of the present invention will be described in detail. The present invention is not limited to the following embodiment, and various changes and modifications may be made within the scope of its gist. In the below, a constituent unit constituting a polymer is referred to as " . . . monomer unit"; and in the case where the constituent unit is described as a material of the polymer, the "unit" is omitted and the constituent unit is described simply as " . . . monomer".

[Hydrogenated Block Copolymer Composition]

The hydrogenated block copolymer composition according to the present embodiment comprises a component (A) comprising at least one polymer block comprising a vinyl aromatic hydrocarbon (hereinafter also simply referred to as a "polymer block Ar") as a primary component and at least one polymer block comprising a conjugated diene compound (hereinafter also simply referred to as a "polymer block D") as a primary component and having a weight-average molecular weight of 30,000 or higher and 500,000 or lower, and a component (B) comprising at least two polymer blocks (polymer blocks Ar) comprising a vinyl aromatic hydrocarbon as a primary component and at least one polymer block (polymer block D) comprising a conjugated diene compound as a primary component and having a weight-average molecular weight of 50,000 or higher and 1,000,000 or lower. Further, the hydrogenated block copolymer composition according to the present embodiment satisfies requirements (a) to (c) below:

(a) the total degree of hydrogenation H (%) of unsaturated double bonds based on the conjugated diene compound is from 5 to 90%;

(b) the maximum value of a loss factor tan δ at from −100° C. to 0° C. is from 0.4 to 4.0; and (c) the ratio between the weight-average molecular weight of the component (A) and the weight-average molecular weight of the component (B) (the weight-average molecular weight of the component (B)/the weight-average molecular weight of the component (A)) is from 1.3 to 10.

Being configured as described above, the hydrogenated block copolymer composition according to the present embodiment has excellent holding power, tack and adhesive power, and, when used as a pressure-sensitive adhesive composition, it can provide an excellent balance between physical properties of pressure-sensitive adhesive property, low-melt viscosity property and the texture of a pressure-sensitive adhesive.

In the present embodiment, in the case where a plurality of each of polymer blocks Ar and/or D is present in the block copolymer of the component (A) and/or the component (B), the weight-average molecular weight, composition and structure of each polymer block Ar or D may be identical or different.

In the present description, "comprising a vinyl aromatic hydrocarbon as a primary component" means that the content of a vinyl aromatic hydrocarbon monomer unit in the polymer block is 60 mass % or higher, preferably 80 mass % or higher, more preferably 90 mass % or higher, and still more preferably 95 mass % or higher.

Further, in the present description, "comprising a conjugated diene compound as a primary component" means that the content of a conjugated diene compound monomer unit in the polymer block is 60 mass % or higher, preferably 80 mass % or higher, more preferably 90 mass % or higher, and still more preferably 95 mass % or higher.

As for the contents of the component (A) and the component (B) in the hydrogenated block copolymer composition, preferably the component (A) is 20 mass % or more and 90 mass % or less and the component (B) is 10 mass % or more and 80 mass % or less. When the contents of the component (A) and the component (B) are in the above ranges, a hydrogenated block copolymer composition and a pressure-sensitive adhesive composition that are favorable in both the low-melt viscosity property and the pressure-sensitive adhesive property and, also in the balance therebetween, are likely to be obtained. From the same viewpoints, more preferably the component (A) is 30 mass % or more and 80 mass % or less and the component (B) is 20 mass % or more and 70 mass % or less, still more preferably the component (A) is 35 mass % or more and 75 mass % or less and the component (B) is 25 mass % or more and 65 mass % or less, and further still more preferably the component (A) is 40 mass % or more and 70 mass % or less and the component (B) is 30 mass % or more and 60 mass % or less.

Further, the hydrogenated block copolymer composition according to the present embodiment may contain a polymer other than the component (A) and the component (B), but the content of the polymer other than the component (A) and the component (B) is preferably 50 mass % or lower, more preferably 30 mass % or lower, still more preferably 20 mass % or lower, further still more preferably 10 mass % or lower, and especially preferably 0 mass %.

The contents of the component (A) and the component (B) can be controlled in the above ranges by adjusting various conditions of a production method described later. Further, the contents of the component (A) and the component (B) can be measured by a method to be described in Examples described later.

The maximum value of a loss factor (tan δ) at −100° C. to 0° C. is from 0.4 to 4.0 in the dynamic viscoelasticity spectrum of the hydrogenated block copolymer composition comprising the component (A) and the component (B). When the maximum value of the loss factor is 0.4 or higher, a hydrogenated block copolymer composition and a pressure-sensitive adhesive composition having an excellent texture and tack are obtained; and when 4.0 or lower, a hydrogenated block copolymer composition and a pressure-sensitive adhesive composition having an excellent holding power are obtained. From the same viewpoints, the maximum value of the loss factor is preferably 0.5 or higher, more preferably 0.6 or higher, still more preferably 0.7 or higher, further still more preferably 0.8 or higher, and even more preferably 0.9 or higher. Further, the maximum value of the loss factor is preferably 2 or lower, more preferably 1.8 or lower, and still more preferably 1.6 or lower. When the maximum value of the loss factor (tan δ) is from 0.7 to 1.6, the texture is especially excellent, and when from 0.9 to 1.6, the tack is especially excellent.

A hydrogenated block copolymer composition and a pressure-sensitive adhesive composition having an excellent texture are excellent in conformability to irregularities of a material to be adhered.

Further, the temperature at which the loss factor (tan δ) at −100° C. to 0° C. has a maximum value is preferably from −75° C. to −50° C. When the temperature at which the loss factor (tan δ) has a maximum value is in this range, the low-temperature property is favorable, and the freedom of a formulation design is enhanced.

Although the method for adjusting the tan δ of the hydrogenated block copolymer composition to the above range is not limited to the following, it is possible to control tan δ, for example, by adjusting the content of the vinyl aromatic hydrocarbon monomer unit in the component (A) and the component (B), the structure, such as the degree of hydrogenation, of the hydrogenated block copolymer, and the conditions at the time of producing the hydrogenated block copolymer composition.

Here, although the method for increasing the maximum value of tan δ is not limited to the following, examples include increasing the number of locations where monomers are added during the polymerization reaction, reducing the difference between the maximum value and the minimum value of the solution temperature during the polymerization reaction, reducing the difference between the maximum value and the minimum value of the solution temperature during the hydrogenation reaction, and increasing the ratio between the height (H) and the inner diameter (diameter, D) of a reactor used for the hydrogenation reaction. Specifically, in order to cause the maximum value of tan δ to be 0.4 or higher, the number of locations where monomers are added during the polymerization reaction is preferably 2 or larger and more preferably 3 or larger, the difference between the maximum value and the minimum value of the solution temperature during the polymerization reaction is preferably 15° C. or smaller and more preferably 5° C. or smaller, the difference between the maximum value and the minimum value of the solution temperature during the hydrogenation reaction is preferably 19° C. or smaller and more preferably 5° C. or smaller, and the ratio between the height (H) and the inner diameter (diameter, D) of a reactor used for the hydrogenation reaction is preferably 5 or higher.

Further, although the method for reducing the maximum value of tan δ is not limited to the following, examples include reducing the number of locations where monomers are added during the polymerization reaction, increasing the difference between the maximum value and the minimum value of the solution temperature during the polymerization reaction, increasing the difference between the maximum value and the minimum value of the solution temperature during the hydrogenation reaction, and reducing the ratio between the height (H) and the inner diameter (diameter, D) of a reactor used for the hydrogenation reaction. Specifically, in order to cause the maximum value of tan δ to be 0.4 or lower, the number of locations where monomers are added during the polymerization reaction is preferably 5 or smaller, the difference between the maximum value and the minimum value of the solution temperature during the polymerization reaction is preferably 0.1° C. or larger, the difference between the maximum value and the minimum value of the solution temperature during the hydrogenation reaction is 0.1° C. or larger, and the ratio between the height (H) and the inner diameter (diameter, D) of a reactor used for the hydrogenation reaction is preferably 7 or lower.

When butadiene is used as a conjugated diene compound monomer, the maximum value of tan δ is likely to be 2.0 or lower. Further, a smaller content of the vinyl aromatic hydrocarbon monomer unit is likely to result in a larger tan δ value. Specifically, although the maximum value of tan δ depends on the above-mentioned conditions during production, the maximum value of tan δ is likely to be 0.6 or higher when the content of the vinyl aromatic hydrocarbon monomer unit is lower than 20 mass %.

In the dynamic viscoelasticity spectrum obtained with respect to the hydrogenated block copolymer composition, the peak of the loss factor present in the above range is a peak resulting from the polymer block (D) comprising a conjugated diene compound as a primary component. A peak of the loss factor may be or may not be present outside the above range.

The dynamic viscoelasticity spectrum can be controlled in the above range by adjusting various conditions of a production method as described above. Further, the dynamic viscoelasticity spectrum can be measured by a method to be described in Examples described later.

The ratio of the weight-average molecular weight of the component (B) to the weight-average molecular weight of the component (A) (the weight-average molecular weight of the component (B)/the weight-average molecular weight of the component (A)) is 1.3 or higher and 10 or lower. When the ratio of the weight-average molecular weight of the component (B) to the weight-average molecular weight of the component (A) is in the above range, a hydrogenated block copolymer composition and a pressure-sensitive adhesive composition are obtained, having excellent low-melt viscosity property, excellent pressure-sensitive adhesive property, and an excellent balance therebetween. From the same viewpoints, the ratio is preferably 1.5 or higher and 8.0 or lower, and more preferably 1.8 or higher and 5.0 or lower. The contents, the weight-average molecular weights, and the ratio of the weight-average molecular weights of the component (A) and the component (B) can be controlled in the above ranges by adjusting various conditions of a production method described later. Further, the contents, the weight-average molecular weights, and the ratio of the weight-average molecular weights of the component (A) and the component (B) can be measured by methods to be described in Examples described later. Hereinafter, the each component will be described in detail.

[Block Copolymers]

(Component (A))

The component (A) is a block copolymer or a mixture thereof, comprising at least one polymer block (Ar) comprising a vinyl aromatic hydrocarbon (a vinyl aromatic hydrocarbon monomer unit) as a primary component and at least one polymer block (D) comprising a conjugated diene compound (a conjugated diene compound monomer unit) as a primary component. Further, the weight-average molecular weight of the block copolymer of the component (A) is 30,000 or higher and 500,000 or lower. When the weight-average molecular weight of the component (A) is 30,000 or higher, a hydrogenated block copolymer composition and a pressure-sensitive adhesive composition can be obtained with excellent productivity, and when the weight-average molecular weight of the component (A) is 500,000 or lower, a hydrogenated block copolymer composition and a pressure-sensitive adhesive composition having excellent low-melt viscosity property and texture can be obtained. From the same viewpoints, the weight-average molecular weight is preferably 50,000 or higher and more preferably 70,000 or higher. Further, the weight-average molecular weight is preferably 175,000 or lower, and more preferably 150,000 or lower. Here, the weight-average molecular weight of the component (A) can be determined by a method to be described in Examples.

The structure of the component (A) is not especially limited, but examples thereof include the following formulae (i) to (vi).

$$(Ar\text{-}D)_n \quad (i)$$

$$D\text{-}(Ar\text{-}D)_n \quad (ii)$$

$$Ar\text{-}(D\text{-}Ar)_n \quad (iii)$$

$$Ar\text{-}(D\text{-}Ar)_n\text{—}X \quad (iv)$$

$$[(Ar\text{-}D)_k]_m\text{—}X \quad (v)$$

$$[(Ar\text{-}D)_k\text{-}Ar]_m\text{—}X \quad (vi)$$

In the above formulae (i) to (vi), Ar denotes a polymer block (Ar) comprising a vinyl aromatic hydrocarbon; D denotes a polymer block (D) comprising a conjugated diene compound as a primary component; X denotes a residue of a coupling agent or a residue of a polymerization initiator such as a polyfunctional organolithium; and m, n and k each denote an integer of 1 or more, preferably an integer of from 1 to 6. Further, when there is a plurality of Ar, the kinds of vinyl aromatic hydrocarbon monomers and the molecular weights may be identical or different, and when there is a plurality of D, the kinds of conjugated diene compound monomers and the molecular weights may be identical or different.

Concerning the above formulae (i) to (vi), a block copolymer containing one Ar is preferable, and a block copolymer represented by Ar-D or D-Ar-D is more preferable. When the component (A) has such a structure, a hydrogenated block copolymer composition and a pressure-sensitive adhesive composition that have better low-melt viscosity property, adhesive power, tack and texture, and the better balance thereamong are likely to be obtained.

(Component (B))

The component (B) is a block copolymer or a mixture thereof, comprising at least two polymer blocks (Ar) comprising a vinyl aromatic hydrocarbon (a vinyl aromatic hydrocarbon monomer unit) as a primary component and at least one polymer block (D) comprising a conjugated diene compound (a conjugated diene compound monomer unit) as a primary component. Further, the weight-average molecular weight of the block copolymer of the component (B) is 50,000 or higher and 1,000,000 or lower. When the weight-average molecular weight of the component (B) is 50,000 or higher, a hydrogenated block copolymer composition and a pressure-sensitive adhesive composition having excellent holding power and adhesive power can be obtained, and when the weight-average molecular weight of the component (B) is 1,000,000 or lower, a hydrogenated block copolymer composition and a pressure-sensitive adhesive composition having excellent low-melt viscosity property and texture can be obtained. From the same viewpoints, the weight-average molecular weight is more preferably 100,000 or higher, still more preferably 140,000 or higher, and further still more preferably 200,000 or higher. Further, the weight-average molecular weight is more preferably 500,000 or lower, and still more preferably 300,000 or lower. Here, the weight-average molecular weight of the component (B) can be determined by the method to be described in Examples.

The structure of the component (B) is not especially limited, but examples thereof include the following formulae (vii) to (xii).

$$(\text{Ar-D})_e \quad \text{(vii)}$$

$$\text{D-(Ar-D)}_e \quad \text{(viii)}$$

$$\text{Ar-(D-Ar)}_g \quad \text{(ix)}$$

$$[\text{Ar-(D-Ar)}_g]_f\text{—X} \quad \text{(x)}$$

$$[\text{D-(Ar-D)}_g]_f\text{—X} \quad \text{(xi)}$$

$$[(\text{Ar-D})_g]_f\text{—X} \quad \text{(xii)}$$

$$[(\text{Ar-D})_g\text{-Ar}]_f\text{—X} \quad \text{(xiii)}$$

In the above formulae (vii) to (xiii), Ar denotes a polymer block (Ar) comprising a vinyl aromatic hydrocarbon as a primary component; D denotes a polymer block (D) comprising a conjugated diene compound as a primary component; X denotes a residue of a coupling agent or a residue of a polymerization initiator such as a polyfunctional organolithium; and e and f each denote an integer of 2 or more and g denotes an integer of 1 or more, and preferably a positive integer of 6 or less. Further, when there is a plurality of Ar, the kinds of vinyl aromatic monomers and the molecular weights may be identical or different, and when there is a plurality of D, the kinds of conjugated diene monomers and the molecular weights may be identical or different.

Among the above formulae (vii) to (xiii), for the component (B), a block copolymer comprising two Ars has a good balance between productivity and pressure-sensitive adhesive performance, and from the viewpoint of pressure-sensitive adhesive performance, a block copolymer comprising three or four Ars or having formula (xi) or formula (xii) in which g=1 is preferable, a block copolymer having formula (xi) or formula (xii) in which g=1 and comprising three or four Ars is more preferable, and it is further preferable to contain block copolymers represented by formulae Ar-D-Ar, $(\text{Ar-D})_2\text{X}$, D-Ar-D-Ar, D-Ar-D-Ar-D, $\text{D-(Ar-D)}_2\text{X}$, $[\text{D-(Ar-D)}_1]_3\text{-X}$, $[(\text{Ar-D})_1]_3\text{-X}$, $[\text{D-(Ar-D)}_1]_4\text{-X}$, and/or $[(\text{Ar-D})_1]_4\text{-X}$. When the component (B) contains such block copolymers, a hydrogenated block copolymer composition and a pressure-sensitive adhesive composition having better productivity and pressure-sensitive adhesive property are likely to be obtained.

From the viewpoints of holding power and adhesive power, the component (B) is preferably a hydrogenated block copolymer composition comprising two polymer blocks comprising a vinyl aromatic hydrocarbon as a primary component and at least one polymer block comprising a conjugated diene compound as a primary component. Further, the weight-average molecular weight of such a block copolymer of the component (B) is preferably 140,000 or higher. The hydrogenated block copolymer composition comprising two polymer blocks comprising a vinyl aromatic hydrocarbon as a primary component and at least one polymer block comprising a conjugated diene compound as a primary component is not especially limited, but examples thereof include formulae Ar-D-Ar, $(\text{Ar-D})_2\text{X}$, D-Ar-D-Ar, D-Ar-D-Ar-D, $\text{D-(Ar-D)}_2\text{X}$, and mixtures thereof.

The content of the vinyl aromatic hydrocarbon monomer unit in the hydrogenated block copolymer composition according to the present embodiment is preferably 5 mass % or higher, more preferably 8 mass % or higher, and still more preferably 10 mass % or higher. Further, the content of the vinyl aromatic hydrocarbon monomer unit in the hydrogenated block copolymer composition is preferably lower than 35 mass %, more preferably lower than 30 mass %, and still more preferably lower than 20 mass %. When the content of the vinyl aromatic hydrocarbon monomer unit in the hydrogenated block copolymer composition according to the present embodiment is in the above range, a hydrogenated block copolymer composition and a pressure-sensitive adhesive composition having excellent pressure-sensitive adhesive performance as well as an excellent balance thereof are likely to be obtained. Particularly when the content of the vinyl aromatic hydrocarbon monomer unit is 5 mass % or higher, a hydrogenated block copolymer composition and a pressure-sensitive adhesive composition having excellent adhesive power and holding power are likely to be obtained. Further, when the content of the vinyl aromatic hydrocarbon monomer unit is lower than 35 mass %, a hydrogenated block copolymer composition and a pressure-sensitive adhesive composition having excellent tack are likely to be obtained. Here, it is especially preferable that the content of the vinyl aromatic hydrocarbon monomer unit is 5 mass % or higher and lower than 20 mass %.

Here, the content of the vinyl aromatic hydrocarbon monomer unit in the hydrogenated block copolymer composition refers to not the content in each component but the content in the hydrogenated block copolymer composition as a whole, i.e., the average of the contents in respective components. The content of the vinyl aromatic monomer unit in the hydrogenated block copolymer composition can be measured by a method to be described in Examples described later.

Further, the vinyl bond content of the conjugated diene compound monomer units in the hydrogenated block copolymer composition according to the present embodiment is preferably lower than 80 mol %, more preferably lower than 70 mol %, and still more preferably lower than 50 mol %. Further, the vinyl bond content of the conjugated diene compound monomer units is preferably 5 mol % or higher, more preferably 8 mol % or higher, more preferably 10 mol % or higher, more preferably 25 mol % or higher, and more preferably 30 mol % or higher. More specifically, the vinyl bond content of the conjugated diene compound monomer units contained in the component (A) and the component (B) is preferably 5 mol % or higher and lower than 80 mol %, more preferably 8 mol % or higher and lower than 70 mol %, and still more preferably 10 mol % or higher and lower than 50 mol %. When the vinyl bond content of the conjugated diene compound monomer units is in the above range, better productivity, tack and adhesive power properties are likely to be obtained.

Here, the vinyl bond content of the conjugated diene compound monomer units refers to not the value of each component but the vinyl bond content in the block copolymer composition as a whole, i.e., the proportion of the sum (mol) of the total amount of 1,2-vinyl bond (conjugated diene compound monomer units incorporated in the polymer by the bonding form of 1,2-bond) and the total amount of 3,4-vinyl bond (conjugated diene compound monomer units incorporated in the polymer by the bond form of 3,4-bond) contained in the composition to the total molar amount of all conjugated diene compound monomer units contained in the composition.

Here, the vinyl bond content in the hydrogenated block copolymer composition is the proportion of the total molar amount of conjugated diene compound monomer units incorporated as 1,2-bond and 3,4-bond prior to hydrogenation to the total molar amount of conjugated diene compound monomer units incorporated by the bonding forms of 1,2-bond, 3,4-bond and 1,4-bond in the polymer prior to hydrogenation.

Here, the proportion of the total molar amount of the conjugated diene compound monomer units incorporated by bonding forms of non-hydrogenated 1,2-bond, hydrogenated 1,2-bond, non-hydrogenated 3,4-bond and hydrogenated 3,4-bond to the total molar amount of the conjugated diene compound monomer units incorporated by bonding forms of non-hydrogenated 1,2-bond, hydrogenated 1,2-bond, non-hydrogenated 3,4-bond, hydrogenated 3,4-bond, non-hydrogenated 1,4-bond and hydrogenated 1,4-bond, after hydrogenation, is equal to the vinyl bond content of the conjugated diene monomer units. That is to say, the vinyl bond content is not different before and after hydrogenation. Therefore, the vinyl bond content of the conjugated diene compound monomer units can be measured by a nuclear magnetic resonance spectral analysis (NMR) using the block copolymer composition that is before or after hydrogenation, and specifically, can be measured by a method to be described in Examples described later.

Here, since the values of the content of the vinyl aromatic hydrocarbon monomer units, the weight-average molecular weights of the component (A) and the component (B), and the contents of the component (A) and the component (B) take nearly the same values before and after hydrogenation, the values after the hydrogenation are employed.

Conjugated bonds in the vinyl aromatic hydrocarbon monomer units may be hydrogenated in the hydrogenation step, but from the viewpoints of the holding power and the adhesive strength, the degree of hydrogenation of the whole vinyl aromatic hydrocarbon monomer units is preferably 30 mol % or lower, more preferably 10 mol % or lower, and still more preferably 3 mol % or lower.

Further, the total degree of hydrogenation H of unsaturated double bonds based on the conjugated diene compound in the hydrogenated block copolymer composition according to the present embodiment is 5 mol % or higher and 90 mol % or lower. When the total degree of hydrogenation H is in the above range, a hydrogenated block copolymer composition and a pressure-sensitive adhesive composition are likely obtained, having excellent pressure-sensitive adhesive property, excellent low-melt viscosity property, excellent texture, and an excellent balance thereamong. From the same viewpoints, the total degree of hydrogenation H is preferably 15 mol % or higher, more preferably 20 mol % or higher, and still more preferably 25 mol % or higher. By setting the degree of hydrogenation in such a manner, holding power, tack and adhesive power tend to improve. Further, the total degree of hydrogenation H is preferably lower than 80 mol %, more preferably 70 mol % or lower, and still more preferably 60 mol % or lower. Such a degree of hydrogenation is likely to result in better low-viscosity property and texture. From the same viewpoints, the total degree of hydrogenation H is preferably 15 mol % or higher and lower than 80 mol %, more preferably 20 mol % or higher and lower than 70 mol %, and still more preferably 25 mol % or higher and lower than 60 mol %. Here, the total degree of hydrogenation H can be measured by a method to be described in Examples.

Here, in the present embodiment, the degree of hydrogenation refers to the proportion of the amount of the hydrogenated unsaturated double bonds to the amount of the unsaturated double bonds based on the conjugated diene compound before hydrogenation. Further, the total degree of hydrogenation refers to the degree of hydrogenation concerning the entire composition, i.e., the proportion of the amount of the hydrogenated unsaturated double bonds to the amount of the unsaturated double bonds based on all conjugated diene compounds contained in the composition before hydrogenation.

For the same reasons, the degrees of hydrogenation of the component (A) and the component (B) are also each preferably from 5 to 90 mol %, more preferably from 15 to 80 mol %, still more preferably, from 20 to 70 mol %, and further still more preferably from 25 to 60 mol %.

Further, for the same reasons, the degrees of hydrogenation are each preferably 15 mol % or higher, more preferably 20 mol % or higher and still more preferably 25 mol % or higher, and preferably lower than 80 mol %, more preferably 70 mol % or lower and still more preferably 60 mol % or lower.

The SP value of the polymer block comprising a conjugated diene compound as a primary component in the hydrogenated block copolymer composition according to the present embodiment is preferably 16.8 ($(MPa)^{1/2}$) or higher, preferably 16.97 ($(MPa)^{1/2}$) or higher, preferably 17.0 ($(MPa)^{1/2}$) or higher, preferably 17.5 ($(MPa)^{1/2}$) or lower, and preferably 17.2 or lower. The SP value is preferably from 16.8 to 17.5 $(MPa)^{1/2}$). Further, the SP value of the polymer block comprising a conjugated diene compound as a primary component is more preferably from 16.97 to 17.5 ($(MPa)^{1/2}$), and more preferably from 17.0 to 17.2 ($(MPa)^{1/2}$).

Further, the SP value of the hydrogenated block copolymer composition is preferably 17.2 ($(MPa)^{1/2}$) or higher, preferably 17.3 ($(MPa)^{1/2}$), preferably 17.7 ($(MPa)^{1/2}$) or lower, and preferably 17.55 ($(MPa)^{1/2}$) or lower. Further, the SP value is preferably from 17.2 to 17.7 ($(MPa)^{1/2}$), preferably from 17.2 to 17.55 ($(MPa)^{1/2}$), and preferably from 17.3 to 17.55 ($(MPa)^{1/2}$).

Further, from the viewpoints of excellent pressure-sensitive adhesive property and/or low melt viscosity property as well as the balance therebetween, it is preferable that the SP value of the polymer block comprising a conjugated diene compound as a primary component in the hydrogenated block copolymer composition is from 16.97 to 17.5 ($(MPa)^{1/2}$) and the SP value of the hydrogenated block copolymer composition is from 16.2 to 17.7 ($(MPa)^{1/2}$), and both of the requirements concerning the respective SP values are simultaneously satisfied.

Here, the SP value of the hydrogenated block copolymer composition is a hypothetical value, and, in the present description, a value obtained by using the calculation method described later is referred to as the SP value.

By setting the SP value in such range, a hydrogenated block copolymer composition and a pressure-sensitive adhesive composition with an excellent pressure-sensitive adhesive property can be obtained.

The SP value of the polymer block comprising a conjugated diene compound as a primary component is calculated from an equation: (SP value)=((Molar cohesive energy)/(Molar volume))$^{1/2}$. In the case where the polymer block comprising a conjugated diene compound as a primary component is composed of two or more different kinds of monomer components, an additive rule is true for the molar cohesive energy, and from the content (mol %) and the molar cohesive energy of each component, the molar cohesive energy of the polymer block comprising a conjugated diene compound as a primary component is calculated as the average of the molar cohesive energy of each component (the proportional average taking into consideration of the proportion of each respective content). As with the molar cohesive energy, an additive rule is also true for the molar volume, and from the content (mol %) and the molar volume of each component, the molar volume of the polymer block comprising a conjugated diene compound as a primary component is calculated as the average of the molar volumes of each component (the proportional average taking into consideration the proportion of each respective content).

The two or more different kinds of components are not especially limited, but include conjugated diene compound monomer units incorporated by bonding forms of non-hydrogenated 1,2-bond, hydrogenated 1,2-bond, non-hydrogenated 3,4-bond, hydrogenated 3,4-bond, non-hydrogenated 1,4-bond or hydrogenated 1,4-bond, and vinyl aromatic hydrocarbon monomer units. Here, the amounts of conjugated diene compound monomer units incorporated by respective bonding forms can be measured by NMR or the like.

Further, the SP value of the entire hydrogenated block copolymer composition was calculated by using the SP values of polymer blocks constituting the components contained therein, assuming that the method for calculating the SP value of a copolymer described in "A Collection of Cases Where Solubility Parameters Are Applied—Based on Mechanism and Solubility Evaluation/Calculation Examples, Etc." edited by Toshio Ogawa, Johokiko (2007), p. 56 is also applicable to a block copolymer. In the case of a block copolymer composition composed of Ar and D, the SP value is calculated from the following equation: (SP value of entire block copolymer composition)$^2$=(SP value of Ar)$^2$×(Total volume fraction of Ar)+(SP value of D)$^2$×(Total volume fraction of D).

Here, the molar volumes and the molar cohesive energies of conjugated diene compound monomer units incorporated by bonding forms of non-hydrogenated 1,2-bond, hydrogenated 1,2-bond, non-hydrogenated 3,4-bond, hydrogenated 3,4-bond, non-hydrogenated 1,4-bond and hydrogenated 1,4-bond, vinyl aromatic hydrocarbon monomer units, and monomer units other than these are determined according to the method (Bicerano method) described in J. Bicerano, Prediction of Polymer Properties, 3rd Ed. Marcel Dekker, 2002.

[Production Method of the Hydrogenated Block Copolymer Composition]

The hydrogenated block copolymer composition can be produced by, for example, successively carrying out, but are not limited to the following, a polymerization step of polymerizing at least a conjugated diene compound monomer and a vinyl aromatic hydrocarbon monomer, with an organolithium compound as a polymerization initiator in a hydrocarbon solvent to thereby obtain a polymer, a hydrogenation step of hydrogenating double bonds of the conjugated diene monomer unit of the obtained polymer, and a solvent removal step of removing the solvent of a solution containing the hydrogenated block copolymer. Here, a component (A) and a component (B) may be produced separately and mixed later, or may be produced simultaneously.

In the case where the component (A) and the component (B) are produced simultaneously, the weight-average molecular weights, the ratio of the weight-average molecular weights, and the contents of the component (A) and the component (B) can be controlled, for example, by adjusting the kind and the addition amount of a coupling agent described later. Further, the weight-average molecular weights, the ratio of the weight-average molecular weights, and the contents of the component (A) and the component (B) can also be controlled by adjusting the addition amount and the number of times of addition of a polymerization initiator described later and adding the polymerization initiator dividedly in a plurality of times. Further, the weight-average molecular weights, the ratio of the weight-average molecular weights, and the contents of the component (A) and the component (B) can also be controlled by adjusting the addition amount of a deactivating agent in a deactivation step described later, which is carried out in the process of polymerization reaction.

(Polymerization Step)

The polymerization step is not limited to the following, but examples thereof include a step of polymerizing at least a conjugated diene compound monomer and a vinyl aromatic hydrocarbon monomer, with an organolithium compound as a polymerization initiator in a hydrocarbon solvent to thereby obtain a polymer.

The polymerization reaction temperature is not especially limited, and is usually 10 to 150° C., preferably 30 to 130° C., and more preferably 40° C. to 100° C. The polymerization pressure is not especially limited as long as it is within a pressure range sufficient to maintain monomers and solvents in a liquid phase at the above polymerization temperature range. Although the required time depends on the conditions and is not especially limited, it is usually within 48 hours and preferably 0.5 to 10 hours.

<The Hydrocarbon Solvent>

As described above, in the polymerization step, a hydrocarbon solvent can be used. The hydrocarbon solvent is not especially limited, but examples thereof include aliphatic hydrocarbons such as butane, pentane, hexane, isopentane, heptane and octane; alicyclic hydrocarbons such as cyclopentane, methylcyclopentane, cyclohexane, methylcyclohexane and ethylcyclohexane; aromatic hydrocarbons such as benzene, toluene, ethylbenzene and xylene. The hydrocarbon solvent may be used singly or as a mixture of two or more.

<The Polymerization Initiator>

In the polymerization step, as the polymerization initiator, at least an organolithium compound is preferably used. The organolithium compound is not especially limited, but examples thereof include organic monolithium compounds, organic dilithium compounds and organic polylithium compounds, which have one or more lithium atoms bound in their molecules. More specifically, the organolithium compounds include ethyllithium, n-propyllithium, isopropyllithium, n-butyllithium, sec-butyllithium, tert-butyllithium, hexamethylenedilithium, butadienyldilithium and isoprenyllithium. The polymerization initiator may be used singly or in combinations of two or more.

In order to obtain a composition containing a plurality kinds of block copolymers with different weight-average molecular weights and structures at one time, it is preferable to add the polymerization initiator to the reaction solution in multiple additions.

<Monomers to be Used for the Polymerization>

The conjugated diene compound is a diolefin having a pair of conjugated double bonds. The conjugated diene compound monomer is not especially limited, but examples thereof include 1,3-butadiene, 2-methyl-1,3-butadiene (isoprene), 2,3-dimethyl-1,3-butadiene, 1,3-pentadiene, 2-methyl-1,3-pentadiene and 1,3-hexadiene. Among these, 1,3-butadiene and isoprene are preferable. Further, from the viewpoint of improving the holding power of the pressure-sensitive adhesive composition, 1,3-butadiene is more preferable. The conjugated diene compound monomer may be used singly or in combinations of two or more.

The vinyl aromatic hydrocarbon monomer is not especially limited, but examples thereof include styrene, α-methylstyrene, p-methylstyrene, divinylbenzene, 1,1-diphenylethylene, N,N-dimethyl-p-aminoethylstyrene and N,N-diethyl-p-aminoethylstyrene. Among these, from the viewpoint of the economic efficiency, styrene is preferable. The vinyl aromatic hydrocarbon monomer may be used singly or in combinations of two or more.

The block copolymers contained in the component (A) and the component (B) may contain monomer units other than the vinyl aromatic hydrocarbon monomer unit and the conjugated diene compound monomer unit; and in the polymerization step, in addition to the vinyl aromatic hydrocarbon monomer and the conjugated diene compound monomer, other monomers that are copolymerizable with these monomers can be used. The other monomers that are copolymerizable with these monomers are not especially limited, but examples thereof include acrylonitrile, methyl α-cyanoacrylate and methyl acrylate.

In the polymerization step, for the purpose of control of the polymerization speed, the micro structure (the ratios of cis, trans and vinyl) of the polymerized conjugated diene compound monomer unit, the reaction ratio of the conjugated diene compound monomer and the vinyl aromatic hydrocarbon monomer, and the like, a polar compound and randomizing agent can be used.

The polar compound and the randomizing agent are not especially limited, but examples thereof include ethers such as tetrahydrofuran, diethylene glycol dimethyl ether and diethylene glycol dibutyl ether; amines such as triethylamine and tetramethylethylenediamine; thioethers, phosphines, phosphoramides, alkylbenzene sulfonate salts, and alkoxides of potassium or sodium.

<The Coupling Agent>

In the polymerization step, a coupling agent represented by X in the above formulae (iv) to (vi) and (x) to (xiii) may be added to a solution containing the vinyl aromatic hydrocarbon-conjugated diene compound block copolymer having an active end in an amount such that the functional group of the coupling agent is less than 1 molar equivalent to the active ends.

The coupling agent to be added is not especially limited, but an optional bi- or more functional coupling agent can be used. The bifunctional coupling agent is not especially limited, but examples thereof include bifunctional halogenated silanes such as dichlorosilane, monomethyldichlorosilane and dimethyldichlorosilane; bifunctional alkoxysilanes such as diphenyldimethoxysilane, diphenyldiethoxysilane, dimethyldimethoxysilane and dimethyldiethoxysilane; bifunctional halogenated alkanes such as dichloroethane, dibromoethane, methylene chloride and dibromomethane; bifunctional halogenated tins such as tin dichloride, monomethyltin dichloride, dimethyltin dichloride, monoethyltin dichloride, diethyltin dichloride, monobutyltin dichloride and dibutyltin dichloride; and dibromobenzene, benzoic acid, CO, and 2-chloropropene.

The trifunctional coupling agent is not especially limited, but examples thereof include trifunctional halogenated alkanes such as trichloroethane and trichloropropane; trifunctional halogenated silanes such as methyltrichlorosilane and ethyltrichlorosilane; trifunctional alkoxysilanes such as methyltrimethoxysilane, phenyltrimethoxysilane and phenyltriethoxysilane; and the like.

The tetrafunctional coupling agent is not especially limited, but examples thereof include tetrafunctional halogenated alkanes such as carbon tetrachloride, carbon tetrabromide and tetrachloroethane; tetrafunctional halogenated silanes such as tetrachlorosilane and tetrabromosilane; tetrafunctional alkoxysilanes such as tetramethoxysilane and tetraethoxysilane; tetrafunctional halogenated tins such as tetrachlorotin and tetrabromotin; and the like.

The penta- or higher functional coupling agent is not especially limited, but examples thereof include 1,1,1,2,2-pentachloroethane, perchloroethane, pentachlorobenzene, perchlorobenzene, octabromodiphenyl ether and decabromodiphenyl ether. Besides, there can also be used epoxidized soybean oils, bi- to hexafunctional epoxy group-containing compounds, carboxylate esters, and polyvinyl compounds such as divinylbenzene. The coupling agent may be used singly or in combinations of two or more.

Among the above, from the viewpoints of the color tone and the low adverse influence on plants, halogen-free coupling agents are preferable. Further, from the viewpoints of the productivity and the low adverse influence on plants, an epoxy group-containing compound or an alkoxysilane is preferable.

As described above, when the coupling agent is added to a solution containing the vinyl aromatic hydrocarbon-conjugated diene compound block copolymer having active ends in an amount such that the functional group of the coupling agent is less than 1 molar equivalent to the active ends, in some parts of block copolymers of the vinyl aromatic hydrocarbon-conjugated diene compound block copolymer having active ends, the active ends are bound with each other through residues of the coupling agent. Further, the remaining parts of the vinyl aromatic hydrocarbon-conjugated diene compound block copolymer having active ends remain in the solution still in their unreacted state. In the reaction using such a coupling agent, by adjusting the kind and the addition amount of the coupling agent, the coupling rate can be controlled.

A polymerization method to be carried out in the polymerization step in the production method of the polymer according to the present embodiment is not especially limited, and well-known methods can be applied. Examples of the methods include methods described in Japanese Patent Publication Nos. 36-19286, 43-17979, 46-32415, 49-36957, 48-2423, 48-4106 and 56-28925, Japanese Patent Laid-Open Nos. 59-166518 and 60-186577, and the like.

<The Deactivating Agent>

In the polymerization step, a deactivating agent may be added. The deactivating agent is not especially limited, but water, alcohols and the like are known. Among these, from the viewpoint of the deactivating efficiency, alcohols are preferable. The deactivating agent may be added at any timing in the polymerization step. In the case where the amount of the deactivating agent added is smaller than 100 mol % of the active ends, the conjugated diene compound monomer and/or the vinyl aromatic hydrocarbon monomer may be further successively added after the addition of the deactivating agent. By doing so, there continues the polymerization reaction of the active ends not having been deactivated with the conjugated diene compound monomer and/or the vinyl aromatic hydrocarbon monomer, and a polymer solution containing polymers having different molecular weights can be obtained.

Further, in the case where the component (A) and the component (B) are produced simultaneously, the contents of the component (A) and the component (B) can be controlled by adjusting the addition molar amount of the deactivating agent relative to the addition amount of the polymerization initiator in the deactivation step. It is likely that the larger the molar amount of the deactivating agent to be added, the higher the content of the component (A) becomes; and the smaller the molar amount of the deactivating agent to be added, the lower the content of the component (B) becomes.

Further, by adding the conjugated diene compound monomer and/or the vinyl aromatic hydrocarbon monomer after the addition of the deactivating agent, and continuing the polymerization reaction, the weight-average molecular weights of the component (A) and the component (B), and the ratio thereof can be controlled. Specifically, it is likely that the larger the amount of the conjugated diene monomer and/or the vinyl aromatic monomer to be added after the addition of the deactivating agent, the higher the weight-average molecular weight of the component (B) becomes, and in association with this, the ratio of the weight-average molecular weights becomes higher.

(Hydrogenation Step)

The hydrogenation step is a step of making the polymer obtained in the polymerization step into a hydrogenated product by hydrogenating double bonds at least in the conjugated diene compound monomer of the polymer. Specifically, by hydrogenating the polymer in an inactive solvent in the presence of a hydrogenation catalyst, a hydrogenated block copolymer solution can be obtained. At this time, the degree of hydrogenation of the block copolymer can be controlled by adjusting the reaction temperature, the reaction time, the amount of hydrogen to be supplied, the amount of the catalyst, and the like.

The catalyst to be used in the hydrogenation reaction is not especially limited, but there are known, for example, (1) supported type heterogeneous catalysts in which a metal such as Ni, Pt, Pd or Ru is supported on a carrier such as carbon, silica, almina or diatomaceous earth, and (2) homogeneous catalysts such as so-called Ziegler catalysts in which an organic salt or an acetylacetone salt of Ni, Co, Fe, Cr or the like is used with a reducing agent such as an organoaluminum, so-called organic complex catalysts such as organometal compounds of Ru, Rh or the like, and catalysts in which a titanocene compound is used with a reducing agent such as an organolithium, an organoaluminum, an organomagnesium or the like. Among these, from the viewpoint of the economic efficiency, the color or the adhesive strength of the polymer, homogeneous catalysts in which a titanocene compound is used with a reducing agent such as an organolithium, an organoaluminum, an organomagnesium or the like are preferred.

The hydrogenation reaction temperature is not especially limited, but it is preferably from 0 to 200° C., and more preferably from 30 to 150° C. The pressure of hydrogen to be used in the hydrogenation reaction is not especially limited, but it is preferably from 0.1 to 15 MPa, more preferably from 0.2 to 10 MPa, and still more preferably from 0.3 to 5 MPa. Further, the hydrogenation reaction time is not especially limited, but it is preferably from 3 min to 10 hours, and more preferably from 10 min to 5 hours. Here, the hydrogenation reaction may be a batch process, a continuous process, or a combination thereof.

A hydrogenation method is not especially limited, but examples thereof include methods described in Japanese Patent Publication Nos. 42-8704, 43-6636, 63-4841 and 63-5401.

The hydrogenation reaction is, though being not especially limited, preferably carried out after a step of deactivating the active ends of the polymer described later, from the viewpoint of high hydrogenation activity.

(Solvent Removal Step)

The solvent removal step is a step of removing the solvent in the solution containing the polymer. A solvent removal method is not especially limited, but examples thereof include methods of removing the solvent by steam stripping or direct solvent removal.

The amount of the remaining solvent in the polymer obtained by the production method of the polymer described above is not especially limited, but it is preferably 2 mass % or smaller, more preferably 0.5 mass % or smaller, still more preferably 0.2 mass % or smaller, further still more preferably 0.05 mass % or smaller, and especially preferably 0.01 mass % or smaller.

Further, from the viewpoints of the heat aging resistance and the suppression of gelation of the hydrogenated block copolymer composition according to the present embodiment, it is preferable that an antioxidant is added. The antioxidant is not especially limited, but examples thereof include phenolic antioxidants of radical scavengers, and phosphorus-based antioxidants or sulfur-based antioxidants of peroxide decomposing agents. Further, antioxidants having both actions may be used. These may be used singly or in combinations of two or more. Among these, from the viewpoints of the heat aging resistance and the suppression of gelation of the polymer, the addition of at least a phenolic antioxidant is preferable.

Moreover, from the viewpoints of preventing coloration of the polymer and achieving a high mechanical strength, it is possible to add a deashing step of removing metals in the polymer, and a neutralization step of adjusting the pH of the polymer, for example, addition of an acid or addition of carbon dioxide gas.

The hydrogenated block copolymer composition according to the present embodiment to be produced as described above may contain so-called modified polymers in which polar group-containing functional groups containing atoms selected from nitrogen, oxygen, silicon, phosphorus, sulfur and tin are bound to the block copolymer, and modified block copolymers in which the block copolymer component is modified with a modifier such as maleic anhydride. Such modified copolymers are obtained by carrying out a well-known modification reaction on the component (A) and the component (B).

A method for adding these functional groups is not especially limited, but examples thereof include methods of adding the functional groups to the polymer by using compounds having the functional groups as an initiator, monomers, a coupling agent or a terminating agent.

The initiator having a functional group is preferably one containing a N group, and includes dioctylaminolithium, di-2-ethylhexylaminolithium, ethylbenzylaminolithium, (3-(dibutylamino)-propyl)lithium and piperidinolithium.

Further, the monomer having a functional group includes compounds obtained by introducing a hydroxide group, an acid anhydride group, an epoxy group, an amino group, an amide group, a silanol group or an alkoxysilane group to the above-mentioned monomer to be used in the polymerization. Among these, monomers having a N group(s) are preferable, and include N,N-dimethylvinylbenzylamine, N,N-diethylvinylbenzylamine, N,N-dipropylvinylbenzylamine, N,N-dibutylvinylbenzylamine, N,N-diphenylvinylbenzylamine, 2-dimethylaminoethylstyrene, 2-diethylaminoethylstyrene, 2-bis(trimethylsilyl)aminoethylstyrene, 1-(4-N, N-dimethylaminophenyl)-1-phenylethylene, N,N-dimethyl-2-(4-vinylbenzyloxy)ethylamine, 4-(2-pyrrolidinoethyl)styrene, 4-(2-piperidinoethyl)styrene, 4-(2-hexamethyleneiminoethyl)styrene, 4-(2-morpholinoethyl)styrene, 4-(2-thiazinoethyl)styrene, 4-(2-N-methylpiperazinoethyl) styrene, 1-((4-vinylphenoxy)methyl)pyrrolidine and 1-(4-vinylbenzyloxymethyl)pyrrolidine.

Further, the coupling agent and the terminating agent having a functional group include, among the above-mentioned coupling agents, compounds having a hydroxide group, an acid anhydride group, an epoxy group, an amino group, an amide group, a silanol group or an alkoxysilane group. Among these, coupling agents having a N group(s) and an O group(s) are preferable, and include tetraglycidylmetaxylenediamine, tetraglycidyl-1,3-bisaminomethylcyclohexane, tetraglycidyl-p-phenylenediamine, tetraglycidyldiaminodiphenylmethane, diglycidylaniline, γ-caprolactone, γ-glycidoxyethyltrimethoxysilane, glycidoxypropyltrimethoxysilane, γ-glycidoxypropyltriphenoxysilane, γ-glycidoxypropylmethyldimethoxysilane, γ-glycidoxypropyldiethylethoxysilane, 1,3-dimethyl-2-imidazolidinone, 1,3-diethyl-2-imidazolidinone, N,N'-dimethylpropylene urea and N-methylpyrrolidone.

[Pressure-Sensitive Adhesive Composition]

The pressure-sensitive adhesive composition according to the present embodiment comprises 100 parts by mass of the above-mentioned hydrogenated block copolymer composition, 20 to 500 parts by mass of a tackifier, and 0 to 300 parts by mass of a softener. Such a pressure-sensitive adhesive composition according to the present embodiment has excellent adhesive power, tack and holding power, and is excellent in the pressure-sensitive adhesive property, the low-viscosity property, texture, and the balance thereamong.

Here, the pressure-sensitive adhesive composition according to the present embodiment may contain polymers other than the component (A) and the component (B) (such as a styrene-butadiene-based block copolymer, a styrene-isoprene-based block copolymer, a hydrogenated styrene-butadiene-based block copolymer, a hydrogenated styrene-isoprene-based block copolymer, a styrene-butadiene-isoprene-based block copolymer, and a hydrogenated styrene-butadiene-isoprene-based block copolymer). In this case, the pressure-sensitive adhesive composition comprises from 20 to 500 parts by mass of a tackifier described later, and from 0 to 300 parts by mass of a softener described later, with respect to 100 parts by mass of the total of such polymers and the component (A) and the component (B) according to the present embodiment Here, according to use applications, it is preferable that the weight-average molecular weights of the components (A) and (B) in the hydrogenated block copolymer composition are selected, and the blend amount of each component of the tackifier, the softener and the like is adjusted.

(Tackifier)

The tackifier can be selected in a wide variety according to use applications and required performance of the obtained pressure-sensitive adhesive composition. The example of the tackifier include, but are not especially limited to, rosin-based compounds such as natural rosin, modified rosin, glycerol esters of natural rosin, glycerol esters of modified rosin, pentaerythritol esters of natural rosin, pentaerythritol esters of modified rosin, hydrogenated rosin and pentaerythritol esters of hydrogenated rosin; terpene-based compounds such as copolymers of natural terpene, three-dimensional polymers of natural terpene, aromatic-modified terpene resins, hydrogenated derivatives of aromatic-modified terpene resins, terpene phenol resins, hydrogenated derivatives of terpene phenol resins, terpene resins (monoterpene, diterpene, triterpene, polyterpene and the like) and hydrogenated terpene resins; and petroleum hydrocarbon-based compounds such as aliphatic petroleum hydrocarbon resins (C5-based resins), hydrogenated derivatives of aliphatic petroleum hydrocarbon resins, aromatic petroleum hydrocarbon resins (C9-based resins), hydrogenated derivatives of aromatic petroleum hydrocarbon resins, dicyclopentadiene-based resins, hydrogenated derivatives of dicyclopentadiene-based resins, C5/C9 copolymer-based resins, hydrogenated derivatives of C5/C9 copolymer-based resins, alicyclic petroleum hydrocarbon resins and hydrogenated derivatives of alicyclic petroleum hydrocarbon resins. These tackifiers can be used singly or in combinations of two or more.

As the tackifier, a liquid tackifier resins which are colorless or light yellow in color tone, substantially free from odor, and good in thermal stability can also be used.

Hereinafter, tackifiers preferred according to use applications and required performance will be described more specifically.

(Tackifiers of Hydrogenated Derivatives)

From the viewpoints of reduced coloration and odor, the tackifier is preferably hydrogenated derivatives. The examples of the hydrogenated derivatives includes, but are not especially limited to, hydrogenated derivatives of rosin resins, hydrogenated derivatives of rosin esters, hydrogenated derivatives of aromatic-modified terpene resins, hydrogenated derivatives of terpene phenol resins, hydrogenated derivatives of aliphatic petroleum hydrocarbon resins (C5-based resins), hydrogenated derivatives of aromatic petroleum hydrocarbon resins (C9-based resins), hydrogenated derivatives of dicyclopentadiene-based resins, hydrogenated derivatives of modified-dicyclopentadiene-based resins, hydrogenated derivatives of C5/C9 copolymer-based resins and hydrogenated derivatives of alicyclic petroleum hydrocarbon resins. Among these, hydrogenated derivatives of aromatic petroleum hydrocarbon resins (C9-based resins) and hydrogenated derivatives of dicyclopentadiene-based resins are especially preferred. Examples of commercially available products of such hydrogenated derivatives include, but are not especially limited to, Arkon P90, Arkon P100, Arkon P115, Arkon P125, Arkon P140 (trade names), Arkon M90, Arkon M100, Arkon M115, Arkon M135 (trade names), Ester Gum H, Ester Gum HP (trade names), and Hypale (trade name) manufactured by Arakawa Chemical Industries, Ltd., Regalite R1010, Regalite R1090, Regalite R1100, Regalite S5100, Regalite R7100, Regalite C6100 (trade names), Easttack C100W, Easttack C100L, Easttack C100R, Easttack C115W, Easttack C115R (trade names), Staybelite E (trade name), Foral AXE (trade name), and Staybelite Ester 10E (trade name) manufactured by Eastman Chemical Co., Clearon P (trade name), Clearon M (trade name), Clearon K (trade name), and YS Polystar UH (trade name) manufactured by Yasuhara Chemical Co., Ltd., Escorez 5340, Escorez 5320, Escorez 5300, Escorez 5380, Escorez 5400, Escorez 227E, Escorez 5600, and Escorez 5690 (trade names) manufactured by Exxon Mobil Corp., Quintone A100, Quintone B170, Quintone M100, Quintone R100, Quintone S195, Quintone D100, Quintone U185, Quintone DX395, Quintone 390N, Quintone N180, Quintone G100B, Quintone G115, Quintone E200SN, Quintone D200, Quintone 1105, Quintone 1325, and Quintone 1340 (trade names) manufactured by Zeon Corp., I-MARV S100, I-MARV S110, I-MARV P100, I-MARV P125, and I-MARV P140 (trade names) manufactured by Idemitsu Kosan Co., Ltd, and Rikarosin F (trade name) manufactured by Rika Fine-tech Inc.

(Tackifiers Other than Hydrogenated Derivatives)

Examples of the tackifiers other than hydrogenated derivatives includes, but are not especially limited to, natural rosin, polymerized rosin, modified rosin, glycerol esters of natural rosin, glycerol esters of modified rosin, pentaerythritol esters of natural rosin, pentaerythritol esters of modified rosin and such rosin esters; copolymers of natural terpene, three-dimensional polymers of natural terpene, aromatic-modified terpene resins, terpene phenol resins and terpene resins; pinene resins, aliphatic petroleum hydrocarbon resins (C5-based resins), aromatic petroleum hydrocarbon resins (C9-based resins), dicyclopentadiene-based resins, C5/C9 copolymer-based resins and alicyclic petroleum hydrocarbon resins. Among these, preferable are aliphatic petroleum hydrocarbon resins (C5-based resins), aromatic petroleum hydrocarbon resins (C9-based resins), C5/C9 copolymer-based resins, alicyclic petroleum hydrocarbon resins, terpene resins, natural and modified rosin esters, and mixtures thereof. Commercially available products include Ester Gum AA-L, Ester Gum A, Ester Gum AAV, Ester Gum, Ester Gum 105, Ester Gum AT, Pensel A, Pensel AZ, Pensel C, Pensel D125, Pensel D160 (trade names), Super Ester (trade name), Tamanol (trade name), Pinecrystal (trade name), and Ardyme (trade name) manufactured by Arakawa Chemical Industries, Ltd., Wingtack 10, Wingtack 95, Wingtack 98, Wingtack Extra, Wingtack RWT-7850, Wingtack PLUS, Wingtack ET, Wingtack STS, Wingtack 86 (trade names), and Norsolnene (product name) manufactured by Cray Valley, Piccotac 8095, Piccotac 1095, Piccotac 1098, and Piccotac 1100 (trade names) manufactured by Eastman Chemical Co., Escorez 1102, Escorez 1202, Escorez 1204LS, Escorez 1304, Escorez 1310, Escorez 1315, Escorez 224, Escorez 2101, Escorez 213, and Escorez 807 (trade names) manufactured by ExxonMobil Chemicals Co., Sylvagum (trade name) and Sylvalite (trade name) manufactured by Arizona Chemical Co., Piccolyte (trade name) manufactured by Ashland Inc, YS Resin PX (trade name), YS Resin PXN (trade name), YS Polystar U (trade name), YS Polystar T (trade name), YS Polystar S (trade name), YS Polystar G (trade name), YS Polystar N (trade name), YS Polystar K (trade name), YS Polystar TH (trade name), YS Resin TO (trade name), YS Resin TR (trade name), and YS Resin SX (trade name) manufactured by Yasuhara Chemical Co., Ltd., and Marukarez M (trade name) manufactured by Maruzen Petrochemical Co., Ltd.

(Aliphatic-Based Tackifiers)

From the viewpoints of providing a pressure-sensitive adhesive composition having high tackiness and high holding power, and the economic efficiency, as the tackifier, aliphatic-based tackifiers are preferably used. The aliphatic-based tackifiers are not especially limited, but examples thereof include aliphatic petroleum hydrocarbon resins (C5-based resins), hydrogenated derivatives of aliphatic petroleum hydrocarbon resins (C5-based resins), C5/C9 copolymer-based resins, hydrogenated derivatives of C5/C9 copolymer-based resins, alicyclic petroleum hydrocarbon resins and hydrogenated derivatives of alicyclic petroleum hydrocarbon resins. Here, the aliphatic-based tackifier refers to a tackifier having a content of aliphatic hydrocarbon group(s) of preferably 50 mass % or higher, more preferably 70 mass % or higher, still more preferably 80 mass % or higher, further still more preferably 88 mass % or higher, and further still more preferably 95 mass % or higher. When the content of aliphatic hydrocarbon group(s) is in the above range, the tackiness, the holding power and the economic efficiency are likely to be further improved.

The aliphatic-based tackifier can be produced by homopolymerizing or copolymerizing a monomer having an aliphatic group and a polymerizable unsaturated group. The monomer having an aliphatic group and a polymerizable unsaturated group is not especially limited, but examples thereof include natural or synthetic terpenes having a C5 or C6, cyclopentyl or cyclohexyl group. Further, other monomers that can be used in the copolymerization are not especially limited, but examples thereof include 1,3-butadiene, cis-1,3-pentadiene, trans-1,3-pentadiene, 2-methyl-1,3-butadiene, 2-methyl-2-butene, cyclopentadiene, dicyclopentadiene, terpene and terpene phenol resins.

(Aromatic Tackifiers)

From the viewpoint of providing a pressure-sensitive adhesive composition having high adhesive strength and high coatability, as the tackifier, aromatic tackifiers are preferably used. The aromatic tackifiers are not especially limited, but examples thereof include aromatic petroleum hydrocarbon resins (C9-based resins) and C5/C9 copolymer-based resins. Here, the aromatic tackifier refers to a tackifier having a content of aromatic hydrocarbon group of preferably 50 mass % or higher, more preferably 70 mass % or higher, still more preferably 80 mass % or higher, further still more preferably 88 mass % or higher, and further still more preferably 95 mass % or higher. When the content of aromatic hydrocarbon group(s) is in the above range, the adhesive power and the coatability are likely to be further improved.

The aromatic tackifier can be produced by homopolymerizing or copolymerizing a monomer having an aromatic group and a polymerizable unsaturated group. The monomer having an aromatic group and a polymerizable unsaturated group is not especially limited, but examples thereof include styrene, α-methylstyrene, vinyltoluene, methoxystyrene, tert-butylstyrene, chlorostyrene and an indene monomer (including methylindene). Further, other monomers that can be used in the copolymerization are not especially limited, but examples thereof include 1,3-butadiene, cis-1,3-pentadiene, trans-1,3-pentadiene, 2-methyl-1,3-butadiene, 2-methyl-2-butene, cyclopentadiene, dicyclopentadiene, terpene and terpene-phenol resins. Commercially available products thereof include Endex 155 (trade name), Kristalex 1120, Kristalex 3085, Kristalex 3100, Kristalex 5140, Kristalex F100 (trade names), Plastolyn 240, Plastolyn 290, and Piccotex 100 (trade name) manufactured by Eastman Chemical Co.

(Tackifiers Having Affinity for Blocks of a Glass Phase (e.g., the Polymer Block (Ar)) and/or Blocks of a Non-Glass Phase (e.g., the Polymer Block (D)) of the Block Copolymer)

From the viewpoints of obtaining a pressure-sensitive adhesive composition having high adhesion, reduced adhesive strength change over time, reduced creep performance (the lower value the better), low melt viscosity, high heat resistance and the good balance thereamong, it is more preferable to contain 20 to 75 mass % of a tackifier having affinity for blocks of the non-glass phase (e.g., the polymer block (D), usually middle blocks) of the block copolymer contained in the pressure-sensitive adhesive composition, and 0.1 to 30 mass % of a tackifier having affinity for blocks (e.g., the polymer block (Ar), usually outer-side blocks) of the glass phase of the block copolymer. The block copolymer used herein is the one comprising the components (A) and (B).

The tackifier having affinity for blocks of the non-glass phase of the block copolymer (e.g., the polymer block (D)) is not especially limited, but examples thereof include rosin-based compounds, terpene-based compounds, aliphatic petroleum hydrocarbon resins (C5-based resins), hydrogenated derivatives of aliphatic petroleum hydrocarbon resins, C5/C9 copolymer-based resins, hydrogenated derivatives of C5/C9 copolymer-based resins, alicyclic petroleum hydrocarbon resins, and hydrogenated derivatives of alicyclic petroleum hydrocarbon resins.

The content of the tackifier having affinity for the non-glass phase of the block copolymer with respect to 100 mass % of the pressure-sensitive adhesive composition is preferably 20 to 75 mass %, more preferably 25 to 70 mass %, and still more preferably 30 to 65 mass %.

The tackifier having affinity for blocks of the glass phase of the block copolymer (e.g., the polymer block (Ar)) is not especially limited, but preferably are, for example, resins having an aromatic ring in their molecule. Such resins are not especially limited, but examples thereof include aromatic group-containing resins such as homopolymers or copolymers containing vinyltoluene, styrene, α-methylstyrene, cumarone or indene as a constituting unit. Among these, preferable are Kristalex, Plastolyn and Piccotex (manufactured by Eastman Chemical Co., trade names) having α-methylstyrene.

The content of the tackifier having affinity for blocks of the glass phase of the block copolymer with respect to 100 mass % of the pressure-sensitive adhesive composition is preferably from 0.5 to 30 mass %, more preferably from 1 to 20 mass %, and still more preferably from 2 to 12 mass %.

From the viewpoint of obtaining a pressure-sensitive adhesive composition having high initial adhesive strength, high wettability, low melt viscosity, high coatability or the like, it is preferable to use, as the tackifier, a petroleum resin having an aroma content of 3 to 12 mass %. Such a petroleum resin is not especially limited, but examples thereof include aliphatic petroleum hydrocarbon resins (C5-based resins), hydrogenated derivatives of aliphatic petroleum hydrocarbon resins (C5-based resins), aromatic petroleum hydrocarbon resins (C9-based resins), hydrogenated derivatives of aromatic petroleum hydrocarbon resins (C9-based resins), dicyclopentadiene-based resins, hydrogenated derivatives of dicyclopentadiene-based resins, C5/C9 copolymer-based resins, hydrogenated derivatives of C5/C9 copolymer-based resins, alicyclic petroleum hydrocarbon resins and hydrogenated derivatives of alicyclic petroleum hydrocarbon resins. The aroma content of the petroleum resin is preferably from 3 to 12 mass %, and more preferably from 4 to 10 mass %. Among these, hydrogenated petroleum resins are especially preferable.

From the viewpoint of obtaining a pressure-sensitive adhesive composition having high initial adhesive strength, high wettability, low melt viscosity, high coatability or the like, it is preferable to use, as the tackifier, a styrene oligomer. The styrene oligomer is not especially limited, but includes aromatic petroleum hydrocarbon resins (C9-based resins) such as Piccolastic A5 and Piccolastic A75 (manufactured by Eastman Chemical Co., trade names).

The content of the styrene oligomer with respect to 100 mass % of the pressure-sensitive adhesive composition is preferably 35 mass % or lower, more preferably 30 mass % or lower, and still more preferably 25 mass % or lower.

From the viewpoint of obtaining a pressure-sensitive adhesive composition having reduced odor property, high weather resistance, high transparency, colorlessness, reduced thermal discoloration and the like, it is preferable to use, as the tackifier, hydrogenated resins (for example, the above-mentioned hydrogenated derivatives).

The content of the tackifier with respect to 100 parts by mass of the hydrogenated block copolymer composition is 20 parts by mass or higher, preferably 30 parts by mass or higher, more preferably 50 parts by mass or higher, and still more preferably 75 parts by mass or higher. Further, the content of the tackifier with respect to 100 parts by mass of the block copolymer composition is 500 parts by mass or lower, preferably 400 parts by mass or lower, and 350 parts by mass or lower. Further, the content of the tackifier with respect to 100 parts by mass of the block copolymer composition is from 20 to 500 parts by mass, preferably from 30 to 400 parts by mass, more preferably from 50 to 350 parts by mass, and still more preferably from 75 to 350 parts by mass. When the content of the tackifier is in the above range, the pressure-sensitive adhesive property is further improved.

In the case where the pressure-sensitive adhesive composition according to the present embodiment comprises polymers other than the component (A) and the component (B) described later, the content of the tackifier with respect to 100 parts by mass of the total of polymers contained in the pressure-sensitive adhesive composition is 20 parts by mass or higher, preferably 30 parts by mass or higher, more preferably 50 parts by mass or higher, and still more preferably 75 parts by mass or higher. Further, the content of the tackifier with respect to 100 parts by mass of the total of polymers contained in the pressure-sensitive adhesive composition is 500 parts by mass or lower, preferably 400 parts by mass or lower, and 350 parts by mass or lower. When the content of the tackifier is in the above range, the pressure-sensitive adhesive property is further improved.

Here, the polymers contained in the pressure-sensitive adhesive composition includes the component (A) and the component (B) as well as the vinyl aromatic elastomer, the conjugated diene-based rubber and the natural rubber described later.

(Softener)

The "softener" refers to an agent having functions of reducing the hardness and viscosity of the pressure-sensitive adhesive composition. The softener is not especially limited, but examples thereof include well-known petroleum-based oils such as paraffinic process oils, naphthenic process oils, aroma-based process oils, extender oils and mixed oils thereof; vegetable oils; plasticizers; synthetic liquid oligomers; and mixtures thereof.

Hereinafter, softeners preferred according to use applications and required performance will be described more specifically.

From the viewpoints of the viscosity reduction, the tackiness improvement and the hardness reduction of the pressure-sensitive adhesive composition, oils can be used. The oils are not especially limited, but include well-known paraffinic process oils, naphthenic process oils, aroma-based process oils, extender oils and mixed oils thereof. From the viewpoints of low-temperature property, aging resistance, contamination resistance, and color tone, paraffinic process oils are preferable; from the viewpoint of compatibility, aroma-based process oils are preferable; and from the viewpoint of the balance among low-temperature property, aging resistance, contamination resistance, color tone, and compatibility, naphthenic process oils are preferable.

In the case where the pressure-sensitive adhesive composition is used as transdermal absorption formulations, from the viewpoints of improving the transdermal absorbability and the preservation stability, and enhancing the drug solubility to the pressure-sensitive adhesive composition, plasticizers can be used as the softener. The plasticizers are not especially limited, but examples thereof include liquid paraffin; fatty acid esters composed of higher fatty acids having from 12 to 16 carbon atoms, such as isopropyl myristate, ethyl laurate and isopropyl palmitate, and lower monohydric alcohols having 1 to 4 carbon atoms; fatty acids having from 8 to 10 carbon atoms; glycols such as ethylene glycol, diethylene glycol, triethylene glycol, polyethylene glycol, propylene glycol and polypropylene glycol; oils and fats such as olive oil, castor oil, squalene and lanolin; organic solvents such as ethyl acetate, ethyl alcohol, dimethyl decyl sulfoxide, decyl methyl sulfoxide, dimethyl sulfoxide, dimethylformamide, dimethylacetamide, dimethyllaurylamide, dodecylpyrrolidone, isosorbitol, oleyl alcohol and lauric acid; liquid surfactants; and ethoxylated stearyl alcohol, glycerin esters, isotridecyl myristate, N-methylpyrrolidone, ethyl oleate, oleic acid, diisopropyl adipate, octyl palmitate, 1,3-propanediol, and glycerin. From among these, compounds that are liquid at normal temperature are used. Among these, glycerin esters are preferable; and more preferable are medium chain fatty acid triglycerides which are esters of fatty acids having from 8 to 10 carbon atoms and glycerin. Examples of the medium chain fatty acid triglycerides include tri(caprylic acid/capric acid) glyceryl. The plasticizer may be used singly or in combinations of two or more.

In the case where the pressure-sensitive adhesive composition and pressure-sensitive adhesive tapes are used as medical pressure-sensitive adhesive tapes such as taping tapes, combination use of liquid paraffin and other plasticizers are preferred.

In the case where the pressure-sensitive adhesive composition and the pressure-sensitive adhesive tapes are used in medical applications, the addition amount of the plasticizer with respect to 100 mass % of the pressure-sensitive adhesive composition is preferably from 3 to 30 mass %, more preferably from 3 to 20 mass %, and still more preferably from 3 to 10 mass %. When the addition amount of the liquid plasticizer is 3 mass % or larger, the transdermal absorbability, the preservation stability, and the drug solubility to the pressure-sensitive adhesive composition are likely to be further improved. Further, when the addition amount of the liquid plasticizer is 20 mass % or smaller, the cohesive force of the pressure-sensitive adhesive composition is likely to be further improved.

In the case where the pressure-sensitive adhesive composition is desired to be softer, from the viewpoint of improving the bleeding property, synthetic liquid oligomers can be used. The synthetic liquid oligomer, which may be referred to as liquid rubber, is not especially limited, but examples thereof include styrene oligomers, butadiene oligomers, isoprene oligomers, butene oligomers, and isobutylene oligomers.

In the case where it is desired to use a naturally occurring component as a softener, a vegetable oil is preferably used. The vegetable oil is not especially limited, but includes castor oil, tall oil and pine tar. From the viewpoint of cold-temperature resistance, castor oil is preferable.

The plasticizer is not especially limited, but includes dibasic acids such as DBP and DOP.

Commercially available products of such softeners are not especially limited, but examples include Diana Fresia S32, Diana Process Oil PW-32, PW-90, PW-150, PS-430, Diana Process Oil NP-24, NR-26, NR-68, NS-90S, NS-100, NM-280, and Diana Process Oil AC-12, AC-640, AH-16, AH-24, and AH-58 (trade names) manufactured by Idemitsu Kosan Co., Ltd., White Oil Broom 350 (trade name) and DN Oil KP-68 (trade name) manufactured by Kukdong Oil & Chem Co., Ltd., Enerper M1930 (trade name) manufactured by BP Chemicals Ltd., Kaydol (trade name) manufactured by Crompton Corp., Primol 352 (trade name) manufactured by Esso Standard Petroleum Co., Ltd., KN4010 (trade name) manufactured by PetroChina Co., Syntac N-40, N-60, N-70, N-75 and N-80, Syntac PA-95, PA-100 and PA-140, and Syntac HA-10, HA-15, HA-30, HA-35 (trade names) manufactured by Kobe Oil Chemical Industrial Co., Ltd., JOMO Process P200, P300, P500 and 750, JOMO Process R25, R50, R200 and R1000, and JOMO Process X50, X100E and X140 (trade names) manufactured by Japan Energy Corp., Sunpar 110, 115, 120, 130, 150, 2100 and 2280, Sunthene Oil 310, 410, 415, 420, 430, 450, 380, 480, 3125, 4130 and 4240, JSO Aroma 790, and Nitprene 720L (trade names) manufactured by Japan Sun Oil Company Ltd., Fukkol Process P-100, P-200, P-300, P-400 and P-500, Fukkol New Flex 1060W, 1060E, 1150W, 1150E, 1400W, 1400E, 2040E and 2050N, Fukkol Aromax 1, 3 and 5, and EXP 1 (trade names) manufactured by Fuji Kosan Co., Ltd., Shell Flex 371JY (trade name) manufactured by Shell Japan, Petrex Process Oil PN-3, PN-3M and PN-3N-H (trade names) and Petrex Process Oil LPO-R, LPO-V and PF-2 (trade names) manufactured by Yamabun Oil Chemical Co., Ltd., and Cosmo Process 40, 40A, 40C, 200A, 100 and 1000 (trade names) manufactured by Cosmo Oil Lubricants Co., Ltd.

Further, the content of the softener with respect to 100 parts by mass of the block copolymer composition is from 0 to 300 parts by mass, preferably 10 to 175 parts by mass, and more preferably 20 to 150 parts by mass. When the content of the softener is in the above range, the pressure-sensitive adhesive property is further improved.

Further, the content of the softener with respect to the pressure-sensitive adhesive composition is preferably 35 mass % or lower, and more preferably 3 mass % or higher and 30 mass % or lower. When the content of the softener is in the above range, the pressure-sensitive adhesive property is further improved.

In the case where the pressure-sensitive adhesive composition according to the present embodiment comprises polymers, described later, other than the component (A) and the component (B), the content of the softener with respect to 100 parts by mass of the total of polymers contained in the pressure-sensitive adhesive composition is from 0 to 300 parts by mass, preferably from 10 to 175 parts by mass, and more preferably from 20 to 150 parts by mass. When the content of the softener is in the above range, the pressure-sensitive adhesive property is further improved.

(Other Components)

The pressure-sensitive adhesive composition according to the present embodiment may comprise, as required, polymers other than the component (A) and the component (B), waxes, polar group-containing polymers, stabilizers and microparticulate fillers.

(Polymers Other than the Component (A) and the Component (B))

Polymers other than the component (A) and the component (B) are not especially limited, but examples thereof include polyolefins, polyolefin based copolymers, vinyl aromatic elastomers and other rubbers. Here, in the present description, "other than the component (A) and the component (B)" means corresponding to neither of the component (A) and the component (B).

The content of the polymers other than the component (A) and the component (B) is not limited, but it is preferable that the total of the component (A) and the component (B) with respect to 100 parts by mass of the total of the component (A), the component (B) and the polymers other than the component (A) and the component (B) is 10 parts by mass or higher. The total of the component (A) and the component (B) may be 20 parts by mass or higher, may be 30 parts by mass or higher, may be 50 parts by mass or higher, may be 70 parts by mass or higher, may be 80 parts by mass or higher, and may be 90 parts by mass or higher. Further, the polymers other than the component (A) and the component (B) may not be contained.

The polyolefins and polyolefin based copolymers are not especially limited, but examples thereof include polymers composed of one kind or two or more kinds of monomers such as ethylene, propylene, 1-butene, 1-pentene, 1-hexene, 4-methyl-1-pentene, 1-octene, and 1-decene, atactic polypropylene, and ethylene-ethyl acrylate copolymers. Commercially available polyolefins include VESTOPLAST 408, VESTOPLAST 508, VESTOPLAST 703, VESTOPLAST 704, and VESTOPLAST 708 (trade names) manufactured by Degussa, and Licocene PP 1302, Licocene PP 1502, Licocene PP 1602, and Licocene PP 2602 (trade names) manufactured by Clariant Japan.

The vinyl aromatic elastomers are not especially limited, but examples thereof include styrene-ethylene-based block copolymers, styrene-butadiene-based block copolymers, styrene-propylene-based block copolymers, styrene-isoprene-based block copolymers, styrene-butadiene-isoprene-based block copolymers, hydrogenated styrene-butadiene-based block copolymers, hydrogenated styrene-isoprene-based block copolymers and hydrogenated styrene-butadiene-isoprene-based block copolymers, which are polymers other than the component (A) and the component (B).

Commercially available products of styrene-isoprene-based block copolymers include Quintac 3421, Quintac 3620, Quintac 3433N, Quintac 3520, Quintac 3450, Quintac 3270, Quintac 3280, and Quintac 3390 (trade names) manufactured by Zeon Corp., D1107P, D1111, D1112P, D1113P, D1114PX, D1117P, D1119P, D1124P, D1128PX, D1193P, and D4433P (trade names) manufactured by Kraton Polymers, and Vector 4111A, Vector 4111N, Vector 4113A, Vector 4113N, Vector 4114A, Vector 4114N, Vector 4186A, Vector 4187A, Vector 4211A, Vector 4211N, Vector 4213A, Vector 4213N, Vector 4215A, Vector 4230, Vector 4293A, and Vector 4411A (trade names) manufactured by TSRC Corp; and commercially available products of styrene-butadiene-based block copolymers include D1101, D1102, D1116, D1118, D1122, D1133, D1144, D1184, D4141, D4150, and D4158 (trade names) manufactured by Kraton Polymers, Vector 2336, Vector 2411, Vector 2411P, Vector 2518, Vector 2518A, Vector 2518LD, Vector 2518P, Vector 2518PC, Vector, Vector 6241A, Vector 7400, Vector 8508, Vector 8508A, Taipol 3201, Taipol 3206, Taipol 4202, Taipol 4230, and Taipol 4270 (trade names) manufactured by TSRC Corp., and Tufprene A, Tufprene 125, Tufprene 126S, Tufprene 315P, Asaprene T411, Asaprene T412, Asaprene T413, Asaprene T420, Asaprene T432, Asaprene T436, Asaprene T437, Asaprene T438, and Asaprene T439 (trade names) manufactured by Asahi Kasei Chemicals Corp. Commercially available products of hydrogenated styrene-isoprene-based block copolymers include G1701, G1702, G1750X, G1765X, and G1780X (trade names) manufactured by Kraton Polymers, and Septon 1001, Septon 1020, Septon 2002, Septon 2004, Septon 2005, Septon 2006, Septon 2007, Septon 2063, and Septon 2104 (trade names) manufactured by Kuraray Co., Ltd. Commercially available products of hydrogenated styrene-butadiene-based block copolymers include G1643, G1645, G1650, G1651, G1652, G1654, G1657, and G1726 (trade names) manufactured by Kraton Polymers, Septon 8004, Septon 8006, Septon 8007, Septon 8076, and Septon 8104 (trade names) manufactured by Kuraray Co., Ltd., Taipol 6150, Taipol 6151, Taipol 6152, Taipol 6154, and Taipol 6159 (trade names) manufactured by TSRC Corp., and H1221, H1062, H1052, H1041, H1051, H1057, H1043, and N504 (trade names) manufactured by Asahi Kasei Chemicals Corp. Commercially available products of hydrogenated styrene-butadiene-isoprene-based block copolymers include Septon 4033, Septon 4044, Septon 4055, Septon 4077, and Septon 4099 (trade names) manufactured by Kuraray Co., Ltd.

Further, the content of the vinyl aromatic elastomers other than the component (A) and the component (B) with respect to 100 parts by mass of the total of the component (A) and the component (B) and block copolymers other than the component (A) and the component (B), is preferably from 5 to 95 parts by mass, more preferably from 10 to 90 parts by mass, and still more preferably from, 15 to 85 parts by mass.

The other rubbers are not especially limited, but examples thereof include natural rubber; and synthetic rubbers such as isoprene-isobutylene rubber, polyisoprene rubber, polybutadiene rubber, styrene-butadiene rubber, styrene-isoprene rubber, propylene-butylene rubber, ethylene-propylene rubber, chloroprene rubber, acrylic rubber and polypentenamer rubber. Among these, from the viewpoints of the crosslinkability and the economic efficiency, natural rubber is preferable.

By using natural rubber, it is likely that the crosslinkability of the pressure-sensitive adhesive composition is further improved and the pressure-sensitive adhesive composition becomes excellent also in the economic efficiency.

When a natural rubber is contained, the content thereof with respect to 100 mass % of the pressure-sensitive adhesive composition is preferably from 3 to 90 mass %, more preferably from 10 to 80 mass %, and still more preferably from 15 to 75 mass %. When the content of the natural rubber is in the above range, the crosslinkability, the heat resistance, the solvent resistance and the economic efficiency of the pressure-sensitive adhesive composition are likely to be further improved.

Hereinafter, polymers other than the component (A) and the component (B) preferred according to use applications and required performance will be described more specifically.

(Hydrogenated Vinyl Aromatic Elastomer)

From the viewpoints of the reduction of adhesive residue after peeling off the pressure-sensitive adhesive composition from an adherend on which the pressure-sensitive adhesive composition was pasted, the suppression of the adhesive strength change over time, the creeping property (the lower value the better), the heat resistance, the weather resistance, and the like of the pressure-sensitive adhesive composition, a hydrogenated vinyl aromatic elastomer can be used. The hydrogenated vinyl aromatic elastomer is not especially limited, but examples thereof include hydrogenated styrene-butadiene-based block copolymers having a structure of S-EB-S(S: polystyrene block, EB: ethylene/butylene copolymer block) or the like; hydrogenated styrene-isoprene-based block copolymers having a structure of S-EP-S(S: polystyrene block, EP: ethylene/propylene copolymer block) or the like; and hydrogenated styrene-butadiene-isoprene-based block copolymers having a structure of S-EEP-S(S: polystyrene block, EEP: ethylene/ethylene/propylene copolymer block) or the like. Among these, preferable are hydrogenated styrene-butadiene-based block copolymers and hydrogenated styrene-isoprene-based block copolymers.

The styrene content of the hydrogenated vinyl aromatic elastomer with respect to 100 mass % of the hydrogenated vinyl aromatic elastomer, is preferably from 10 mass % to 45 mass %, more preferably from 13 mass % to 40 mass %, and still more preferably from 15 mass % to 35 mass %.

Further, the content of the polystyrene block of the hydrogenated vinyl aromatic elastomer with respect to 100 mass % of the hydrogenated vinyl aromatic elastomer, is preferably 30 mass % or lower, more preferably 21 mass % or lower, and still more preferably 15 mass % or lower. When the content of the polystyrene block is in the above range, the flexibility and the compatibility are likely to be further improved.

Further, it is preferred that the content of B in the ethylene/butylene copolymer block in the hydrogenated vinyl aromatic elastomer is high; and the content of B with respect to 100 mass % of the hydrogenated vinyl aromatic elastomer, is preferably 35 mol % or higher, more preferably 45 mol % or higher, still more preferably 55 mol % or higher, and especially preferably 60 mol % or higher. When the content of B in the ethylene/butylene copolymer block is in the above range, the flexibility and the compatibility are likely to be further improved.

The degree of hydrogenation of unsaturated double bonds based on the conjugated diene compound in the hydrogenated vinyl aromatic elastomer is preferably higher than 90 mol %.

(Other Partially Hydrogenated Vinyl Aromatic Elastomer)

From the viewpoint of adjusting the cohesion, adhesive power, tack and T (ODT) (order-disorder transition temperature) of the viscous adhesion composition, it is preferable to use other partially hydrogenated vinyl aromatic elastomer. By adjusting T (ODT) (order-disorder transition temperature), it is possible to adjust melt viscosity. The other partially hydrogenated vinyl aromatic elastomer refers to an elastomer that comprises at least one polymer block comprising a vinyl aromatic hydrocarbon as a primary component and at least one polymer block comprising a conjugated diene compound as a primary component, has a degree of hydrogenation H (%) of unsaturated double bonds based on the conjugated diene compound of from 5 to 90 mol %, and has a maximum value of a loss factor tan δ at from −100° C. to 0° C. of lower than 0.4.

(Non-Hydrogenated Vinyl Aromatic Elastomer)

From the viewpoint of imparting high flexibility and high adhesion to the pressure-sensitive adhesive composition and suppressing gelation or from the viewpoint of high economic efficiency or the like, a non-hydrogenated vinyl aromatic elastomer may be used. The non-hydrogenated vinyl aromatic elastomer is not especially limited, but examples thereof include styrene-ethylene-based block copolymers; styrene-butadiene-based block copolymers having a structure S—B—S, $(S—B)_nX$ (S: polystyrene block, B: polybutadiene block, X: a residue of a coupling agent) or the like; styrene-propylene-based block copolymers; styrene-isoprene-based block copolymers having a structure of S—I—S, $(S—I)_nX$ (S: polystyrene block, I: polyisoprene block, X: a residue of a coupling agent) or the like; and styrene-butadiene-isoprene-based block copolymers having a structure of $(S—(I/B))_nX$, S—(I/B)—S(S: polystyrene block, I/B: isoprene/butadiene copolymer block (isoprene and butadiene may be alternately arranged in any proportion, and the proportion may not be constant), X: a residue of a coupling agent) or the like. Among these, $(S—I)_nX$, $(S—B)_nX$ and $(S—(I/B))_nX$ are preferable, and those having a radial structure are more preferable. These may be used singly or in combinations of two or more.

The styrene content of the non-hydrogenated vinyl aromatic elastomer with respect to 100 mass % of the non-hydrogenated vinyl aromatic elastomer, is preferably 45 mass % or lower.

Further, the content of diblocks (for example, S—B, S—I, S—B—X, S—I—X) of the non-hydrogenated vinyl aromatic elastomer with respect to 100 mass % of the non-hydrogenated vinyl aromatic elastomer, is preferably from 10 to 80 mass %.

(Isoprene-Based Block Copolymer)

From the viewpoint of imparting excellent tack to the pressure-sensitive adhesive composition or from the viewpoint of economic efficiency, an isoprene-based block copolymer having a non-hydrogenated isoprene monomer unit may be used. The isoprene-based block copolymer is not especially limited, but preferable are, for example, styrene-isoprene-based block copolymers having a structure of (S—I)n, (S—I)n-S, (S—I)nX (S: polystyrene block, I: polyisoprene block, n: an integer of 1 or more, preferably an integer of 1 to 6, X: a residue of a coupling agent) or the like. These may be used singly or in combinations of two or more.

The styrene content of the isoprene-based block copolymer with respect to 100 mass % of the isoprene-based block copolymer, preferably 30 mass % or lower, more preferably 25 mass % or lower, still more preferably 20 mass % or lower, and further still more preferably 18 mass % or lower.

(Conjugated Diene-Based Rubber)

From the viewpoints of the processability, the low melt viscosity at 180° C. or lower, and good tack, adhesive power, adhesion and die cutting property, a conjugated diene-based rubber can be used. The conjugated diene-based rubber is not especially limited, but examples thereof include isoprene-isobutylene rubber, polyisoprene rubber, polybutadiene rubber, styrene-butadiene rubber, styrene-isoprene rubber and propylene-butylene rubber.

Further, from the viewpoint of improving the self-back face adhesive power and the skin patching strength of pressure-sensitive adhesive tapes, a polybutadiene rubber or a polyisoprene rubber may be used for the pressure-sensitive adhesive composition for pressure-sensitive adhesive tapes. Among these, a polyisoprene rubber is more preferable. The addition amount of the polybutadiene rubber and the polyisoprene rubber with respect to 100 mass % of the pressure-sensitive adhesive composition is preferably from 3 to 25 mass %, more preferably from 5 to 20 mass %, and still more preferably from 5 to 15 mass %. When the addition amount of the polybutadiene rubber and the polyisoprene rubber is 3 mass % or larger, the self-back face adhesive power and the skin patching strength are likely to be further improved. Further, when the addition amount of the polybutadiene rubber and the polyisoprene rubber is 25 mass % or smaller, it is likely that the cohesive force is further improved and the adhesive residue is more reduced.

From the viewpoints of the processability of the pressure-sensitive adhesive composition, the low melt viscosity at 180° C. or lower, and good tack, adhesive power and adhesion, a conjugated diene-based diblock copolymer may be used as the conjugated diene-based rubber. The conjugated diene-based diblock copolymer is not especially limited, but examples thereof include polymers having a structure of S—I, (S—I)X, S—B, (S—B)X or the like, and hydrogenated materials thereof. These may be used singly or in combinations of two or more, and may be liquid or solid at normal temperature.

The content of the conjugated diene-based rubber with respect to 100 mass % of the pressure-sensitive adhesive composition is preferably from 3 to 90 mass %, more preferably from 10 to 80 mass %, and still more preferably from 15 to 75 mass %. When the content of the conjugated diene-based rubber is in the above range, the oil bleeding resistance, low melt viscosity, tack, adhesive power, adhesion and flexibility of the pressure-sensitive adhesive composition are likely to be further improved.

(Ionomer)

In the case where high low-temperature coatability, low creep performance, high strength or high elongation, and the like are required for the pressure-sensitive adhesive composition, a polymer may be used in the state of being an ionomer. The ionomer is not especially limited, but, for example, homopolymers or copolymers containing carboxylates, sulfonates or phosphonates which are neutralized or partially neutralized with metal ions are preferred. The content of the ionomer with respect to the total amount of the pressure-sensitive adhesive composition is preferably 5 mass % or lower.

(Polyolefin Based Resin)

From the viewpoint of imparting high temperature storage stability and high elongation and from the viewpoint of reducing the amount of the tackifying resin in the pressure-sensitive adhesive composition (55 mass % or smaller, further, 45 mass % or smaller, in the composition), or the like, a polyolefin based resin can be used. The polyolefin based resin is not especially limited, but, for example, a copolymer of an α-olefin with an olefin, or a propylene homopolymer are preferred. The melting point (condition: DSC measurement, 5° C./min) of these polymers is preferably 110° C. or lower, more preferably 100° C. or lower, and still more preferably from 60° C. to 90° C. These polymers may be resins or elastomers.

Further from the viewpoint of the creeping performance (the lower value the better), an olefin based elastomer having blocks is more preferable. The molecular weight distribution of these polymers is preferably from 1 to 4, and more preferably from 1 to 3. Further from the viewpoint of the processability, combination use of two or more of the polymers is more preferable. Specifically, combination use of the polymers of from 30,000 to 60,000 and from 60,000 to 90,000 is preferable; and combination use of at least the polymers of from 35,000 to 55,000 and from 60,000 to 80,000 is more preferable.

(Liquid Component)

In the pressure-sensitive adhesive composition using the polyolefin based resin, a liquid component (oil or the like) is preferably contained. The content of the liquid component with respect to 100 mass % of the pressure-sensitive adhesive composition is preferably 20 mass % or higher, and more preferably 25 mass % or higher. Further, in the case where the elongation is required, combination use of olefin based elastomers is preferable; and combination use of olefin based elastomers having a Tg of −10° C. or lower is more preferable.

(Wax)

In the pressure-sensitive adhesive composition, as required, a wax may be contained. The addition amount of the wax with respect to 100 mass % of the pressure-sensitive adhesive composition is preferably 20 mass % or lower, more preferably from 2 to 10 mass %, and still more preferably from 5 to 10 mass %. When the addition amount of the wax is in the above range, the melt viscosity, particularly the melt viscosity at 140° C. or lower, is likely to be more lowered.

The wax is not especially limited, but examples thereof include paraffin wax, microcrystalline wax and Fischer-Tropsh wax. By using such wax, the melt viscosity, particularly the melt viscosity at 140° C. or lower, is likely to be more lowered.

The melting point of the wax is preferably 50° C. or higher, more preferably 65° C. or higher, still more preferably 70° C. or higher, and further still more preferably 75° C. or higher. Further, the melting point of the wax is preferably 110° C. or lower. When the melting point of the wax is in the above range, the melt viscosity, particularly the melt viscosity at 140° C. or lower, is likely to be more lowered.

Here, the softening point of the tackifier to be concurrently used with the wax is preferably 70° C. or higher, and more preferably 80° C. or higher. G' (measurement condition: 25° C., 10 rad/sec) of the pressure-sensitive adhesive composition to be obtained in this case is preferably 1 MPa or lower; and the crystallization temperature thereof is preferably 7° C. or lower.

As usable waxes, commercial available products include trade name "115", trade name "120", trade name "125", trade name "130", trade name "135", trade name "140", trade name "150", trade name "155", trade name "HNP-3", trade name "HNP-5", trade name "HNP-9", trade name "HNP-10", trade name "HNP-11", trade name "HNP-12", trade name "HNP-51", trade name "SP-0145", trade name "SP-0160", trade name "SP-0165", trade name "SP-1035", trade name "SP-1040", trade name "SP-3035", trade name "SP-3040", trade name "EMW-0001", trade name "EMW-0003", trade name "Hi-Mic-1045", trade name "Hi-Mic-1070", trade name "Hi-Mic-1080", trade name "Hi-Mic-1090", trade name "Hi-Mic-2045", trade name "Hi-Mic-2065", and trade name "Hi-Mic-2095" manufactured by Nippon Seiro Co., Ltd., "Ultrathene 7A55A" manufactured by Tosoh Corp., and trade name "A-C 540", trade name "A-C 540A", trade name "A-C 580", trade name "A-C 5120", trade name "A-C 400", trade name "A-C 400A", trade name "A-C 405(S)", trade name "A-C 405(M)", trade name "A-C 405(T)", trade name "A-C 645P", trade name "A-C 573A", and trade name "A-C 573P" manufactured by Honeywell.

(Polar Group-Containing Polymer)

The pressure-sensitive adhesive composition may contain, as required, a polar group-containing polymer having an atom(s) selected from the group consisting of nitrogen, oxygen, silicon, phosphorus, sulfur, tin and the like. The polar group-containing polymer is not especially limited, but examples thereof include so-called modified polymers in which these polar group-containing functional groups are bound to block copolymers, modified block copolymers obtained by modifying block copolymer components with a modifier such as maleic anhydride, and oils modified on side chains and terminals with an amine, epoxy, carboxylic acid, carboxylic anhydride or the like. By using the polar group-containing polymer, the pressure-sensitive adhesive property to adherends having a high SP value, such as resins including superabsorbent polymers (SAP), acrylic resins, vinyl chloride resins and nylon resins, crosslinked materials thereof, glasses, and metals, is likely to be further improved.

Commercially available products include HG252 (trade name) manufactured by Kuraray Co., Ltd., M1943, M1911, M1913, MP10, and Tufprene 912 (trade names) manufactured by Asahi Kasei Chemicals Corp., and Taipol 7131 (trade name) manufactured by TSRC Corp.

(Stabilizer)

The pressure-sensitive adhesive composition may contain, as required, a stabilizer. The "stabilizer" is a material to be blended to improve the stability of the hot melt adhesives by preventing the reduction of the molecular weight, the gelation and the coloration, the generation of odors and the like due to heat, and is not especially limited.

As the stabilizer, antioxidants, light stabilizers and the like can be exemplified. The antioxidants and the light stabilizers are usually used in disposable products, and can be used as long as being capable of providing desired disposable products described later, and are not especially limited.

(Antioxidant)

The "antioxidant" can be used, for example, in order to prevent the oxidative deterioration of the hot melt adhesives. The antioxidant is not especially limited, but examples thereof include phenol-based antioxidants such as 2,6-di-t-butyl-4-methylphenol, n-octadecyl-3-(4'-hydroxy-3',5'-di-t-butylphenyl) propionate, 2,2'-methylenebis(4-methyl-6-t-butylphenol), 2,2'-methylenebis(4-ethyl-6-t-butylphenol), 2,4-bis[(octylthio)methyl]-o-cresol, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate and 2-[1-(2-hydroxy-3,5-di-tert-pentylphenyl)] acrylate; sulfur-based antioxidants such as dilauryl thiodipropionate, lauryl stearyl thiodipropionate pentaerythritol-tetrakis(β-lauryl thiopropionate); and phosphorus-based antioxidants such as tris(nonylphenyl) phosphite and tris(2, 4-di-t-butylphenyl) phosphite. These may be used singly or in combinations of two or more.

Specific examples of commercially available products of the antioxidant include Sumiriser GM (trade name), Sumiriser TPD (trade name) and Sumiriser TPS (trade name), manufactured by Sumitomo Chemical Co., Ltd., Irganox 1076 (trade name), Irganox 1010 (trade name), Irganox HP2225FF (trade name), Irgafos 168 (trade name) and Irganox 1520 (trade name), manufactured by Ciba Specialty Chemicals Corp., and JF77 (trade name), manufactured by Johoku Chemical Co., Ltd.

The content of the antioxidant with respect to 100 parts by mass of the pressure-sensitive adhesive composition is preferably 10 parts by mass or lower, and more preferably 5 parts by mass or lower.

(Light Stabilizer)

The "light stabilizer" can be used, for example, in order to improve the light resistance of hot melt adhesives (a reduced pressure-sensitive adhesive property change after UV irradiation). The light stabilizer is not especially limited, but examples thereof include benzotriazole-based ultraviolet absorbents such as 2-(2'-hydroxy-5'-methylphenyl)benzotriazole, 2-(2'-hydroxy-3',5'-t-butylphenyl)benzotriazole and 2-(2'-hydroxy-3',5'-di-t-butylphenyl)-5-chlorobenzotriazole; benzophenone-based ultraviolet absorbents such as 2-hydroxy-4-methoxybenzophenone; triazine-based ultraviolet absorbents; hindered amine-based light stabilizers; and lactone-based stabilizers: HALS. These may be used singly or in combinations of two or more.

Specific examples of commercially available products of the light stabilizer include Tinuvin P (trade name), Tinuvin 770DF (trade name) and Cimassorb 2020FDL (trade name), manufactured by BASF, and ADK STAB LA-52 (trade name), ADK STAB LA-57 (trade name) and ADK STAB LA-77Y (trade name), manufactured by Adeka Corp.

In order to achieve high light resistance, the light stabilizer content in the pressure-sensitive adhesive composition according to the present embodiment is preferably 0.03 mass % or higher, more preferably 0.05 mass % or higher, and still more preferably 0.07 mass % or higher.

Further, in terms of suppressing the bleeding of the light resisting agent and economic efficiency, the content of the light resisting agent in the pressure-sensitive adhesive composition according to the present embodiment is preferably 1 mass % or lower, more preferably 0.5 mass % or lower, and still more preferably 0.3 mass % or lower.

In order to achieve higher light resistance, it is preferable to use the above light resisting agent further in combination with the above antioxidant.

In order to achieve higher light resistance, it is preferable to use at least a phosphorous antioxidant among antioxidants in addition to the above light resisting agent.

In terms of high light resistance, the antioxidant content in the pressure-sensitive adhesive composition according to the present embodiment is preferably 0.02 mass % or higher, more preferably 0.04 mass % or higher, and still more preferably 0.06 mass % or higher.

Further, in terms of suppressing the bleeding of the antioxidant and economic efficiency, the content of the light resisting agent in the pressure-sensitive adhesive composition according to the present embodiment is preferably 1.5 mass % or lower and more preferably 1.0 mass % or lower.

(Microparticulate Fillers)

The pressure-sensitive adhesive composition may contain, as required, a microparticulate filler. The microparticulate filler is not especially limited, but examples thereof include mica, calcium carbonate, kaolin, talc, titanium oxide, diatomaceous earth, urea-based resins, styrene beads, calcinated clay, starch, zinc oxide, active zinc oxide, light magnesium carbonate, silica gel hydroxide, diatomaceous earth, and barium sulfate. Their shapes are preferably spherical and their sizes (the diameter in the case of spherical shape) are not especially limited.

[Properties of the Pressure-Sensitive Adhesive Composition]

The performance of the pressure-sensitive adhesive composition according to the present embodiment can be measured by using pressure-sensitive adhesive tapes fabricated under the conditions indicated in Examples described later and under the measurement conditions indicated in Examples.

G' (measurement condition: 25° C., 10 rad/sec) of the pressure-sensitive adhesive composition is preferably 20,000 or lower, and more preferably 15,000 or lower. When G' of the pressure-sensitive adhesive is in the above range, the adhesive residue of the pressure-sensitive adhesive composition is likely to be more reduced.

Further, the content of a liquid diluent with respect to 100 mass % of the pressure-sensitive adhesive composition is preferably 60 mass % or lower. When the content of the liquid diluent is in the above range, the pressure-sensitive adhesive composition is useful particularly for the application of adhesives to skins including transdermal drug delivery applications.

The pressure-sensitive adhesive composition according to the present embodiment can be utilized also in paper processing, bookbinding, disposable products and the like. Among these, it is suitable for disposable products, since it is excellent in adhesion in the wet state. The disposable products can be prepared by solution coating or hot melt coating the pressure-sensitive adhesive composition on at least one kind of members selected from the group consisting of woven fabrics, nonwoven fabrics, rubbers, resins, papers, polyolefin films, polyester films, PVC films, ionomer films, PVDC films, PVA films, PC films, PS films, PAN films, PEN films, cellophane films, nylon films, polyimide films, EMAA films and EVOH films. Here, among polyolefin films, polyethylene films and polypropylene films are preferable for the reasons of the durability, the cost and the like. Here, among papers, craft papers are preferable for the reasons of the durability, the cost and the like, and polyethylene-laminated craft papers are preferable from the viewpoints of the durability and the water resistance.

The melt viscosity at 150° C. of a hot melt pressure-sensitive adhesive for disposable products for sanitary materials is preferably 5,000 mPa·s or lower, more preferably from 400 to 3,500 mPa·s, and still more preferably from 800 to 3,000 mPa·s. The melt viscosity is a viscosity of the hot melt pressure-sensitive adhesive in a molten state, and is measured by a Brookfield RVT-type viscometer (spindle: No. 27). When the melt viscosity is in the above range, the hot melt pressure-sensitive adhesive is suitable for disposable products for sanitary materials, since the hot melt pressure-sensitive adhesive becomes suitable for low-temperature coating, and thereby it also becomes easy to be uniformly coated even on nonwoven fabrics and to penetrate therein.

The disposable products for sanitary materials are not especially limited, but examples thereof include paper diapers, sanitary napkins, pet sheets, hospital gowns and white scrub suits.

[Production Method of the Pressure-Sensitive Adhesive Composition]

The pressure-sensitive adhesive composition according to the present embodiment can be produced by mixing the above-mentioned hydrogenated block copolymer composition with the tackifier, the softener and other components as required, by a well-known method. A mixing method is not especially limited, but examples thereof include a method of homogeneously mixing the block copolymer composition, the tackifier and the softener under heating by a mixer, a kneader or the like.

The temperature in mixing is preferably from 130° C. to 220° C., more preferably from 140° C. to 210° C., and still more preferably from 150° C. to 200° C. When the temperature in mixing is 130° C. or higher, it is likely that the block copolymer composition can be sufficiently melted and the dispersion becomes good. Further, when the temperature in the mixing is 220° C. or lower, it is likely that the evaporation of low-molecular weight components of the crosslinking agent and the tackifier, and the deterioration of the pressure-sensitive adhesive property can be prevented.

[Coating Method of the Pressure-Sensitive Adhesive Composition]

In the case of using the pressure-sensitive adhesive composition as a coating, the coating method therefor is not especially limited as long as being capable of providing desired products, and examples thereof include a method of solution coating in which the pressure-sensitive adhesive composition is dissolved in a solvent and coated, and a method of hot melt coating or the like in which the pressure-sensitive adhesive composition is melted and coated.

Among these, a hot melt coating method is preferred from the viewpoints of the environmental pollution and the ease of coating. The hot melt coating method is roughly divided into contact application and non-contact application. The "contact application" refers to an application method in which an ejector is brought into contact with a member or a film when a hot melt adhesive is applied. Further, the "non-contact application" refers to an application method in which when a hot melt adhesive is applied, an ejector is not brought into contact with a member or a film. The contact application method is not especially limited, but examples thereof include slot coater coating, roll coater coating, die coating, porous coating in which coating is carried out porously, and pattern coating. Further, the non-contact application method is not especially limited, but examples thereof include spiral coating in which an adhesive can be applied spirally using air by intermittent or continuous coating, omega coating or control seam coating in which an adhesive can be applied wavelike, slot spray coating or curtain spray coating in which coating can be carried out planarly, dot coating in which coating can be carried out dottedly, bead coating in which coating can be carried out linearly, foaming melt coating in which a hot melt is foamed, coating on a threadlike material, and spray coating in which coating is carried out mistily.

In conventional hot melt adhesives having poor thermal stability, phase separation easily occurs in high-temperature tanks. The phase separation even makes a cause of clogging of tank filters and transport pipe. In this regard, the pressure-sensitive adhesive composition according to the present embodiment is good in thermal stability, and is homogeneously melted in a high-temperature tank of from 100 to 220° C. and suppress the phase separation.

In production lines of disposable products for sanitary materials, a hot melt adhesive is generally applied on various types of members of the disposable products (for example, tissue, cotton, nonwoven fabric, polyolefin film and the like). In the application, the hot melt adhesive may be sprayed from various types of sprays.

The hot melt pressure-sensitive adhesive for disposable products for sanitary materials is suitable for spiral coating. It is remarkably useful for production of disposable products that the hot melt pressure-sensitive adhesive can be coated broadly by spray coating. When the hot melt adhesive can be coated broadly, the coating width can be set to narrow by adjusting the pressure of hot air.

If a hot melt pressure-sensitive adhesive is difficult to coat broadly, a number of spray nozzles are needed in order to obtain a sufficient adhesive area, so such a hot melt pressure-sensitive adhesive is unsuitable even for the production of disposable products having a comparatively small size, such as urine-taking liners, and disposable products having complex shapes.

In this regard, the pressure-sensitive adhesive composition according to the present embodiment is, since being allowed to be coated broadly in spiral coating, suitable for the disposable products for sanitary materials.

The pressure-sensitive adhesive composition according to the present embodiment is, since being good in coating suitability at 150° C. or lower, useful for production of the disposable products for sanitary materials. When the hot melt adhesive is coated at a high temperature, polyolefin (preferably polyethylene) films of base materials of disposable products, are melted or thermally shrunk, and the appearance of the disposable products is largely damaged. When the hot melt pressure-sensitive adhesive is coated at 150° C. or lower, the appearance of polyolefin (preferably polyethylene) films and nonwoven fabrics of base materials of disposable products does almost not change, and the appearance of the products are not damaged.

The pressure-sensitive adhesive composition according to the present embodiment is, since being excellent in high-speed coating suitability, suitable for production of disposable products for sanitary materials in a short time. In the case where a hot melt pressure-sensitive adhesive is coated on a base material being conveyed at a high speed, in the contact-type coating method, breakage of the base material occurs due to friction in some cases. The pressure-sensitive adhesive composition according to the present embodiment is, since being suitable for spiral coating, which is one type of non-contact coating, suitable for high-speed coating, and improves the production efficiency of the disposable products. Further, the pressure-sensitive adhesive composition according to the present embodiment is suitable for high-speed coating, and when it is used for high-speed coating, disturbance in coated pattern does not occur.

[Applications]

The pressure-sensitive adhesive composition according to the present embodiment has good solubility, coatability, discharge stability and surface, is excellent in tackiness and adhesive power, and is good in the balance among these pressure-sensitive adhesive properties. By making the best use of these features, the pressure-sensitive adhesive composition can be utilized for various types of pressure-sensitive adhesive tapes and labels, pressure-sensitive thin plates, pressure-sensitive sheets, surface protection sheets and films, backside adhesives for fixing various types of light-weight plastic molds, backside adhesives for fixing carpets, backside adhesives for fixing tiles, adhesives and the like, and can suitably be used for pressure-sensitive adhesives for various applications particularly for pressure-sensitive adhesive tapes, pressure-sensitive adhesive sheets and films, pressure-sensitive adhesive labels, surface protection sheets and films, and sanitary materials.

EXAMPLES

Hereinafter, the present embodiment will be described in detail by way of specific Examples and Comparative Examples, but the present embodiment is not limited to the following Examples. Here, in the following Examples and Comparative Examples, measurements of characteristics and physical properties of polymers were carried out by the following methods.

[(1): Properties of the Hydrogenated Block Copolymer Composition]<(1-1) Weight-Average Molecular Weight>

Measurement was performed by the measurement method (1) below. In the case where the molecular weight of the component (B) was 2.5 times or larger than the molecular weight of the component (A) when measured by the measurement method (1), measurement was performed by the measurement method (2), and its results were regarded as the weight-average molecular weights of the component (A) and the component (B).

1. Measurement Method (1)

The weight-average molecular weights of the component (A) and the component (B) were determined under the measurement conditions described later by using a calibration curve determined by the measurement of a commercially available standard polystyrene (peak molecular weights of the standard polystyrenes were used), based on the peaks of a chromatogram obtained from the (hydrogenated) block copolymer composition of each Example as a measurement sample. That is to say, the weight-average molecular weights were determined by using HLC-8320EcoSEC Collection as a software for the measurement was; and HLC-8320 Analysis as a software for the analysis.

In view of the preparation method (the polymerization method and the kind and the amount of the coupling agent used) described later, a peak having the lowest peak-top molecular weight was determined as the peak of the component (A) among the peaks having a peak top in the molecular weight range of 30,000 or higher and having an area ratio of 0.1 or higher to the total peak area of the block copolymer composition, and a peak having a higher peak-top molecular weight than the molecular weight of the component (A), having a peak top in the molecular weight range of 50,000 or higher, and having an area ratio of 0.1 or higher to the total peak area was determined as the peak of the component (B).

The weight-average molecular weights of the component (A) and the component (B) can be determined with the system/software described later by separating peaks vertically to the baseline at each interpeak inflection point on a GPC curve. Here, the lowest point (valley peak) in the vertical direction between adjacent peaks was regarded as an interpeak inflection point. In the case where the lowest point was continuous, its intermediate point was regarded as an interpeak inflection point. Peak separation was conducted by dividing two peaks vertically at the inflection point using the waveform separation function of the above-mentioned system/software, and after division, each weight-average molecular weight and area ratio were calculated.

(Measurement Conditions)

GPC: HLC-8320GPC (manufactured by Tosoh Corp.)

System (measurement/analysis) software: HLC-8320EcoSEC Collection, HLC-8320 Analysis (manufactured by Tosoh Corp.)

Detector: RI

Detection sensitivity: 3 mV/min

Sampling pitch: 600 msec

Column: TSKgel superHZM-N (6 mm-I.D×15 cm), 4 columns (manufactured by Tosoh Corp.)

Solvent: THF (tetrahydrofuran)

Flow rate: 0.6 mm/min

Concentration: 0.5 mg/mL

Column temperature: 40° C.

Injection volume: 20 μL

2. Measurement Method (2)

The weight-average molecular weights of the component (A) and the component (B) were determined under the measurement conditions described later by using a calibration curve determined by the measurement of a commercially available standard polystyrene (peak molecular weights of standard polystyrenes were used), based on the peaks in chromatogram obtained from the (hydrogenated) block copolymer composition of each Example as a measurement sample. That is to say, the software used for the measurement/analysis was Empower 3 to determine the weight-average molecular weights. For those that were hydrogenated, the molecular weights of polymers after hydrogenation were measured.

First, a peak having the lowest peak-top molecular weight was determined as the peak of the component (A) among the independent peaks having a peak top in a molecular weight range of 30,000 or higher and having an area ratio calculated by the peak division described later of 0.2 or higher to the total peak area of the block copolymer composition, and peaks having a higher peak-top molecular weight than that were all determined as the peaks of the component (B) (provided that the weight-average molecular weights of the peaks were lower than 1,000,000).

Here, the weight-average molecular weights of the component (A) and the component (B) can be determined with the system/software described later by separating peaks vertically to the baseline at each interpeak inflection point on a GPC curve. Here, the lowest point (valley peak) in the vertical direction between adjacent peaks was regarded as an interpeak inflection point. In the case where the lowest point was continuous, its intermediate point was regarded as an interpeak inflection point. Peak separation was conducted by dividing two peaks vertically at the inflection point using the waveform separation function of the above-mentioned system/software, and after division, each weight-average molecular weight and area ratio were calculated.

(Measurement Conditions)

GPC: ACQUITY APC System (manufactured by Nihon Waters K.K.)

System (measurement/analysis) software; Empower 3 (manufactured by Nihon Waters K.K.)

Detector: RI

Refractive index unit full scale: 500 μRIU

Output full scale: 2000 mV

Sampling rate: 10 points/sec

Columns: ACQUITY APC XT 125 (4.6 mm×150 mm); 1

ACQUITY APC XT 200 (4.6 mm×150 mm); 1

ACQUITY APC XT 900 (4.6 mm×150 mm); 1

ACQUITY APC XT 450 (4.6 mm×150 mm); 1

Solvent: THF (tetrahydrofuran)

Flow rate: 1.0 mL/min

Concentration: 0.1 mg/mL

Column temperature: 40° C.

Injection volume: 20 μL

<(1-2) Contents of Component (A) and Component (B)>

The contents of the component (A) and the component (B) were obtained from each peak area ratio of the component (A) and the component (B) determined by the method described in the above (1-1) to the total peak area of the elution curve measured by the measurement method (1) or (2) of (1-1).

Here, the area ratio was determined by dividing peaks vertically at inflection point between the peaks by using the analysis software, HLC-8320 Analysis.

<(1-3) Content of the Vinyl Aromatic Hydrocarbon Monomer Unit (Styrene)>

A predetermined amount of the hydrogenated block copolymer composition was dissolved in chloroform; and by using an ultraviolet spectrometer (UV-2450, manufactured by Shimadzu Corp.), t the peak intensity at an absorption wavelength (262 nm), which is attributable to the vinyl aromatic hydrocarbon component (styrene) in the solution, was measured. From the acquired peak intensity, the content of the vinyl aromatic hydrocarbon monomer unit (styrene) was calculated by using the calibration curve.

<(1-4) Vinyl Bond Content in Conjugated Diene Compound Monomer Unit and Degree of Hydrogenation of Conjugated Diene Compound Monomer Unit>

Under the following conditions, the vinyl bond content in the hydrogenated block copolymer composition and the total degree of hydrogenation of unsaturated double bonds based on the conjugated diene compound were measured by the nuclear magnetic resonance spectrum analysis (NMR).

By adding a large amount of methanol to the reaction solution after the hydrogenation reaction, the hydrogenated block copolymer composition was precipitated and recovered. Then, the recovered hydrogenated block copolymer composition was extracted with acetone, and vacuum dried. The component thus obtained was used as a sample for $^1$H-NMR measurement, and the total degree of hydrogenation and the vinyl bond content were measured.

The measurement conditions of $^1$H-NMR were as follows.

(Measurement Conditions)

Measuring instrument: JNM-LA400 (manufactured by JEOL Ltd.)

Solvent: deuterated chloroform

Measurement sample: products removed from the polymer before and after the hydrogenation Sample concentration: 50 mg/mL Observation frequency: 400 MHz Chemical shift reference: TMS (tetramethylsilane)

Pulse delay: 2.904 sec

Number of times of scanning: 64 times

Pulse width: 45°

Measurement temperature: 26° C.

<(1-5) Maximum Value of Loss Factor Tan δ of Dynamic Viscoelasticity Spectrum>

A dynamic viscoelasticity spectrum was measured by the following method to obtain the maximum value of a loss factor tan δ.

First, a hydrogenated block copolymer composition was formed into a sheet having a thickness of 2 mm and then cut out to a size of 10 mm in width and 35 mm in length to yield a measurement sample.

The measurement sample was placed in the twist-type geometry of an ARES apparatus (manufactured by TA Instruments, trade name) and measured under the conditions including an effective measurement length of 25 mm, a strain of 0.5%, a frequency of 1 Hz, a measurement range of from −100° C. to 100° C. and a heating rate of 3° C./min.

<(1-6) SP Value>

The molar volume and the molar cohesive energy were determined according to the Bicerano method.

Here, the contents of 1,2-bond before hydrogenation, 1,2-bond after hydrogenation, 1,4-bond before hydrogenation and 1,4-bond after hydrogenation for determining the SP value of the polymer block comprising a conjugated diene compound as a primary component were calculated from the degree of hydrogenation and the vinyl bond content as follows.

1,2-bond before hydrogenation (mol %); (Vinyl bond content)−(1,2-bond after hydrogenation)

1,2-bond after hydrogenation (mol %); (Vinyl bond content)×(Degree of hydrogenation of vinyl bond content)

1,4-bond before hydrogenation (mol %); 100−(Vinyl bond content)−(1,4-bond after hydrogenation)

1,4-bond after hydrogenation (mol %); (Degree of hydrogenation)−(1,2-bond after hydrogenation)

[(2) Measurements of Physical Properties of Pressure-Sensitive Adhesive Compositions]

(Preparation of Pressure-Sensitive Adhesive Compositions (Blend α, Blend β, Blend γ))

Blend α: 100 parts by mass of a hydrogenated block copolymer composition, 140 parts by mass (100 parts by mass in Example 16 and Example 20) of Quintone R100 (manufactured by Zeon Corp.) as a tackifier, and 30 parts by mass of Diana Process Oil NS-90S (manufactured by Idemitsu Kosan Co., Ltd.) as a softener were blended, and melt kneaded at 180° C. for 30 min by a pressurized double-arm kneader (type: D0.3-3, Moriyama Manufacturing Co., Ltd.) to thereby obtain a homogeneous hot melt-type pressure-sensitive adhesive composition.

Blend β: 100 parts by mass of a hydrogenated block copolymer composition, 180 parts by mass of Quintone R100 (manufactured by Zeon Corp.) as a tackifier, and 70 parts by mass of Diana Process Oil PW-90 (manufactured by Idemitsu Kosan Co., Ltd.) as a softener were blended, and melt kneaded at 180° C. for 30 min by a pressurized double-arm kneader (type: D0.3-3, Moriyama Manufacturing Co., Ltd.) to thereby obtain a homogeneous hot melt-type pressure-sensitive adhesive composition.

Blend γ: The formulation shown in Table 5 was melt kneaded at 180° C. for 30 min by a pressurized double-arm kneader (type: D0.3-3, Moriyama Manufacturing Co., Ltd.) to thereby obtain a homogeneous hot melt-type pressure-sensitive adhesive composition.

Here, with respect to 100 parts by mass of the hydrogenated block copolymer composition, 1 part by mass of 2-t-butyl-6-(3-t-butyl-2-hydroxy-5-methylbenzyl)-4-methylphenyl acrylate as a stabilizer was added to each pressure-sensitive adhesive composition.

<(2-1-1) Melt Viscosity of Pressure-Sensitive Adhesive Composition (Blend α)>

The melt viscosity of the pressure-sensitive adhesive composition was measured at 180° C. by a Brookfield viscometer (DV-III, manufactured by Brookfield Engineering Laboratories, Inc.). The melt viscosity was evaluated based on the acquired value according to the following criteria. The evaluation was rated as ⊚, ○, x in the order from the best to the worst.

Melt viscosity (Pa·s)≤50: ⊚

50<melt viscosity (Pa·s)≤150: ○

150<melt viscosity (Pa·s): x

<(2-1-2) Melt Viscosity of Pressure-Sensitive Adhesive Composition (Blend β)>

The melt viscosity of the pressure-sensitive adhesive composition was measured at 160° C. by a Brookfield viscometer (DV-III, manufactured by Brookfield Engineering Laboratories, Inc.). The melt viscosity was evaluated based on the acquired value according to the following criteria. The evaluation was rated as ○, Δ, x in the order from the best to the worst.

Melt viscosity (Pa·s)≤15: ○

15<melt viscosity (Pa·s)≤50: Δ

50<melt viscosity (Pa·s): x

<(2-2-1) Penetration of Pressure-Sensitive Adhesive Composition (Blend α)>

In order to evaluate the texture of the pressure-sensitive adhesive composition, the distance that a prescribed needle entered into the pressure-sensitive adhesive composition maintained at 25° C. in a constant temperature bath in 5 seconds was measured in accordance with JIS-K 2207. The evaluation was rated as ⊚, ○, x in the order from the best to the worst.

Penetration (1/10 mm)≥60: ⊚

60>Penetration (1/10 mm)≥45: ○

45>Penetration (1/10 mm)≥30: Δ

30>Penetration (1/10 mm): x

<(2-2-2) Penetration of Pressure-Sensitive Adhesive Compositions (Blend β, Blend γ)>

In order to evaluate the textures of the pressure-sensitive adhesive compositions, the distance that a prescribed needle entered into the pressure-sensitive adhesive compositions maintained at 25° C. in a constant temperature bath in 5 seconds was measured in accordance with JIS-K 2207. The evaluation was rated as ○, x in the order from the best to the worst.

Penetration (1/10 mm)≥40: ○

40>Penetration (1/10 mm): x (Preparation of Pressure-Sensitive Adhesive Tape)

A molten pressure-sensitive adhesive composition was cooled to room temperature and dissolved in toluene. The obtained toluene solution was coated on a PET film by an applicator, and thereafter held at room temperature for 30 min and in an oven of 70° C. for 7 min to completely evaporate toluene to thereby fabricate a pressure-sensitive adhesive tape. The thicknesses of the PET film, which was the substrate of the pressure-sensitive adhesive tape, and a tacky layer were 50 μm/40 μm, respectively, in the case of the pressure-sensitive adhesive composition (Blend α), and 38 μm/30 μm, respectively, in the case of the pressure-sensitive adhesive composition (Blend β).

<(2-3) Probe Tack of Pressure-Sensitive Adhesive Compositions (Blend α, Blend γ)>

The probe tacks of the pressure-sensitive adhesive compositions were measured in accordance with ASTM D2979. A pressure-sensitive adhesive tape was pasted on a weight (a load of 10 g) at a temperature of 23° C., and then a probe (5 mm ϕ) was brought into contact with the pressure-sensitive adhesive tape at a speed of 1 mm/sec. After 1 sec, the probe was peeled off at a speed of 1 mm/sec, and the maximum value at this time was measured as the value of probe tack to evaluate tack. The evaluation was rated as ⊚, ○, Δ, x in the order from the best to the worst.

Probe tack (N/5 mm ϕ)≥2.0: ⊚

2.0>Probe tack (N/5 mm ϕ)≥1.2: ○

1.2>Probe tack (N/5 mm ϕ)≥0.6: Δ

0.6>Probe tack (N/5 mm ϕ): x

<(2-4-1) Adhesive Power of Pressure-Sensitive Adhesive Composition (Blend α)>

A pressure-sensitive adhesive tape of 25 mm in width was pasted on a SUS plate, and peeled off at a peeling speed of 300 mm/min; and the 180° peeling force at this time was measured. Based on the acquired peeling force, the adhesive power of the pressure-sensitive adhesive composition was evaluated according to the following criteria. The evaluation was rated as ○, Δ, x in the order from the best to the worst.

7≤Adhesive power (N/10 mm): ○

4≤Adhesive power (N/10 mm)<7: Δ

Adhesive power (N/10 mm)<4: x

<(2-4-2) Adhesive Power of Pressure-Sensitive Adhesive Compositions (Blend β, Blend γ)>

A pressure-sensitive adhesive tape of 25 mm in width was pasted on a SUS plate, and peeled off at a peeling speed of 300 mm/min; and the 180° peeling force at this time was measured. Based on the acquired peeling force, the adhesive power of the pressure-sensitive adhesive compositions was evaluated according to the following criteria. The evaluation was rated as ○, x in the order from the best to the worst.

5≤Adhesive power (N/10 mm): ○

Adhesive power (N/10 mm)<5: x

<(2-5-1) Holding Power of Pressure-Sensitive Adhesive Composition (Blend α)>

A pressure-sensitive adhesive tape was pasted on an SUS plate such that the area of contact was 15 mm×15 mm, a load of 1 kg was applied at 50° C., and the time elapsed until the pressure-sensitive adhesive tape slipped down was measured. Based on the acquired time, the holding power of the pressure-sensitive adhesive composition was evaluated according to the following criteria. The evaluation was rated as ◎, ○, Δ, x in the order from the best to the worst.

300≤Holding power (min): ◎

130≤Holding power (min)<300: ○

70≤Holding power (min)<130: Δ

Holding power (min)<70: x

<(2-5-2) Holding Power of Pressure-Sensitive Adhesive Compositions (Blend β, Blend γ)>

A pressure-sensitive adhesive tape was pasted on an SUS plate such that the area of contact was 25 mm×15 mm, a load of 1 kg was applied at 50° C., and the time elapsed until the pressure-sensitive adhesive tape slipped down was measured. Based on the acquired time, the holding powers of the pressure-sensitive adhesive compositions were evaluated according to the following criteria. The evaluation was rated as ○, Δ, x in the order from the best to the worst.

30≤Holding power (min): ○

5≤Holding power (min)<30: Δ

Holding power (min)<5: x

<(2-6) Ball Tack of Pressure-Sensitive Adhesive Composition (Blend β)>

The tacks of the pressure-sensitive adhesive compositions obtained in Examples and Comparative Examples were each evaluated by the inclined ball tack according to JIS-Z0237. Specifically, a triangular apparatus having a slope (slope angle: 30°) equipped with a starting point where a rigid ball is placed, and an approach run path (100 mm) continuing from the starting point and a tacky face (100 mm) of a pressure-sensitive adhesive tape continuing from the approach run path on the slope was prepared; and rigid balls (size: from 1/32 to 32/32 inch) were rolled down from the upper starting point of the slope toward the tacky face on the lower part of the slope. A numerical value 32 times the size of the ball suspended on the tacky face was called a "ball number"; and the maximum value of ball numbers of the balls which were suspended on the tacky face was measured. Based on the acquired ball number, the tack of the pressure-sensitive adhesive composition was evaluated according to the following criteria. The evaluation was rated as ○, Δ, x in the order from the best to the worst.

25≤ball number: ○

20≤ball number <25: Δ

Ball number <20: x

[(3) Preparation of a Hydrogenation Catalyst>

In Examples and Comparative Examples described later, a hydrogenation catalyst to be used when a hydrogenated block copolymer composition was fabricated was prepared by the following method. The atmosphere of a reaction vessel equipped with a stirring device was replaced by nitrogen, and 1 L of dried and refined cyclohexane was charged therein. Then, 100 mmol of bis(η5-cyclopentadienyl)titanium chloride was added. A n-hexane solution containing 200 mmol of trimethylaluminum was further added under sufficient stirring, and allowed to react at room temperature for about 3 days. Thereby, a hydrogenation catalyst was obtained.

[(4) Preparation of Hydrogenated Block Copolymer Compositions]

Production Example 1

A 40 L-internal volume stainless steel autoclave with a stirrer and a jacket was cleaned and dried, and the atmosphere thereof was replaced with nitrogen; 5,960 g of cyclohexane was charged; and warm water was passed through the jacket, and the content was set at 70° C. Then, 2.5 g of N,N,N',N'-tetrametylethylenediamine (hereinafter, referred to as "TMEDA") and a n-butyllithium cyclohexane solution (3.79 g in terms of pure content) were added, and a styrene-containing cyclohexane solution (430 g in terms of pure content) was continuously added. The polymerization conversion rate of the styrene was 100%. Successively, a 1,3-butadiene-containing cyclohexane solution (2600 g in terms of pure content) was continuously added to continue polymerization. The polymerization conversion rate of the butadiene was 100%. Thereafter, 4.84 g of a coupling agent was added to perform a coupling reaction. The coupling agent used was a mixture of Epotohto ZX-1059 (Nippon Steel & Sumikin Chemical Co., Ltd.) and cyclohexane in a mass ratio of 90:10. After the coupling agent addition, 0.70 g of methanol was added for deactivation. Monomers were added from three locations while controlling such that the monomers were always added to the polymerization solution, and the temperature difference between the lowest temperature and the highest temperature of the solution during polymerization was 3.2° C.

Then, the hydrogenation catalyst prepared as described above was added to the obtained block copolymer composition solution, in an amount of 100 ppm in terms of Ti of the hydrogenation catalyst prepared as described above with respect to 100 parts by mass of the block copolymer composition; and a hydrogenation reaction was carried out in a continuous process. Concerning the hydrogenation reactor used at this time, the ratio (H/D) of the height (H) to the inner diameter (diameter, D) of the reactor was 5.2, and the difference between the maximum value and the minimum value of the temperature of the solution during the hydrogenation reaction was 3.2° C. The total degree of hydrogenation of unsaturated double bonds based on the conjugated diene compound in the obtained hydrogenated block copolymer composition was 52 mol %.

To the obtained hydrogenated block copolymer composition solution, octadecyl-3-(3,5-di-t-butyl-4-hydroxyphenyl) propionate was added in 0.3 parts by mass with respect to 100 parts by mass of the block copolymer composition, and sufficiently mixed. Thereafter, the solvent was removed under heating to thereby obtain a composition of Production Example 1. In the obtained hydrogenated block copolymer composition, the styrene content was 14 mass %, and the average vinyl bond content of the butadiene portion was 38 mass %. Further, as to the obtained hydrogenated block copolymer composition, the content of the component (A) was 48 mass %, the weight-average molecular weight was 115,000, the content of the component (B) was 52 mass %, and the weight-average molecular weight was 228,000. The molecular weights and the contents were determined according to the measurement method (1). The maximum value of tan δ was 1.5.

Production Example 2

(Component (A))

A 40 L-internal volume stainless steel autoclave with a stirrer and a jacket was cleaned and dried, and the atmosphere thereof was replaced with nitrogen; cyclohexane was charged; and warm water was passed through the jacket, and the content was set at 65° C. TMEDA and a n-butyllithium cyclohexane solution were added, and a styrene-containing cyclohexane solution was continuously added. The polymerization conversion rate of the styrene was 100%. Successively, a 1,3-butadiene-containing cyclohexane solution was continuously added to continue polymerization. The polymerization conversion rate of the butadiene was 100%. Thereafter, methanol was added for deactivation. Monomers were added from three locations while controlling such that the monomers were always added to the polymerization solution, and the temperature difference between the lowest temperature and the highest temperature of the solution during polymerization was 3.8° C.

Then, the hydrogenation catalyst prepared as described above was added to the obtained block copolymer solution, in an amount of 100 ppm in terms of Ti of the hydrogenation catalyst with respect to 100 parts by mass of the block copolymer; and a hydrogenation reaction was carried out at a hydrogen pressure of 0.8 MPa at an average temperature of 110° C. in a continuous process. Concerning the hydrogenation reactor used at this time, H/D was 5.2, and the difference between the maximum value and the minimum value of the solution during the hydrogenation reaction was 4.2° C.

To the obtained hydrogenated block copolymer solution, octadecyl-3-(3,5-di-t-butyl-4-hydroxyphenyl) propionate was added in an amount of 0.3 parts by mass with respect to 100 parts by mass of the block copolymer, and sufficiently mixed. The component (A) of Production Example 2 was obtained by the above operation.

(Component (B))

A 40 L-internal volume stainless steel autoclave with a stirrer and a jacket was cleaned and dried, and the atmosphere thereof was replaced with nitrogen; cyclohexane was charged; and warm water was passed through the jacket, and the content was set at 65° C. TMEDA and a n-butyllithium cyclohexane solution were added, and a styrene-containing cyclohexane solution was continuously added. The polymerization conversion rate of the styrene was 100%. Successively, a 1,3-butadiene-containing cyclohexane solution was continuously added to continue polymerization. The polymerization conversion rate of the butadiene was 100%. Successively, a styrene-containing cyclohexane solution was continuously added to continue polymerization. The polymerization conversion rate of the styrene was 100%. Thereafter, methanol was added for deactivation. Monomers were added from three locations while controlling such that the monomers were always added to the polymerization solution, and the temperature difference between the lowest temperature and the highest temperature of the solution during polymerization was 3.8° C.

Then, the hydrogenation catalyst prepared as described above was added to the obtained block copolymer solution, in an amount of 100 ppm in terms of Ti of the hydrogenation catalyst per 100 parts by mass of the block copolymer; and a hydrogenation reaction was carried out at a hydrogen pressure of 0.8 MPa at an average temperature of 110° C. in a continuous process. Concerning the hydrogenation reactor used at this time, H/D was 5.2, and the difference between the maximum value and the minimum value of the temperature of the solution during the hydrogenation reaction was 4.1° C.

Octadecyl-3-(3,5-di-t-butyl-4-hydroxyphenyl) propionate was added in amount of 0.3 parts by mass with respect to 100 parts by mass of the block copolymer to the obtained hydrogenated block copolymer solution, and sufficiently mixed. A component (B) of Production Example 2 was obtained by the above operation.

Finally, the hydrogenated block copolymer solution containing the above component (A) and the hydrogenated block copolymer solution containing the above component (B) were mixed, and the solvent was removed under heating to thereby obtain a hydrogenated block copolymer composition of Production Example 2. Some of the obtained reaction solution was sampled, and the same measurement as in Production Example 1 was performed. These measurement values are shown in Table 1.

Production Examples 3 to 18, 22 and 23

Hydrogenated block copolymer compositions of Production Examples 3 to 18, 22 and 23 were obtained in the same way as in Production Example 1, except for altering the amounts of TMEDA, n-butyllithium, styrene, 1,3-butadiene, a coupling agent and methanol, and production conditions to those indicated in Table 1, respectively. The same measurement as in Production Example 1 was performed on these hydrogenated block copolymer compositions. Results are shown in Table 1.

Production Examples 19 to 21

Hydrogenated block copolymer compositions of Production Examples 19 to 21 were obtained in the same way as in Production Example 1, except for altering the amounts of TMEDA, n-butyllithium, styrene, 1,3-butadiene, a coupling agent and methanol, the kind of the coupling agent, and production conditions to those indicated in Table 1, respectively. Here, tetraethoxysilane was used as the coupling agent. The same measurement as in Production Example 1 was performed on these hydrogenated block copolymer compositions, except for the measurement of the molecular weight and the content. The molecular weight and the content were determined according to the measurement method (2). Results are shown in Table 1.

Example 1

A homogenous hot melt pressure-sensitive adhesive composition was obtained by the above-mentioned preparation method of the pressure-sensitive adhesive composition (Blend α) using the hydrogenated block copolymer composition of Production Example 1. Further, a pressure-sensitive adhesive tape was obtained by the above-mentioned preparation method of a pressure-sensitive adhesive tape. Physical properties of the above-mentioned pressure-sensitive adhesive composition were measured by using these pressure-sensitive adhesive composition and pressure-sensitive adhesive tape. These results are shown in Table 2.

Examples 2 to 13, Comparative Examples 1 to 7

Pressure-sensitive adhesive compositions and pressure-sensitive adhesive tapes were fabricated, and their physical properties were evaluated, by carrying out the same operation as in Example 1, except for using the hydrogenated block copolymer compositions of Production Examples 2 to 11, 18, 19, 12 to 17 and 23 in place of the hydrogenated block copolymer composition of Production Example 1. These results are shown in Table 2. Here, in the case where the torque did not become stabilized even after the kneading was carried out for 30 min, the kneading was carried out until the torque became stabilized.

Examples 14, 15, 17 to 19

Pressure-sensitive adhesive compositions and pressure-sensitive adhesive tapes were fabricated, respectively, by carrying out the same operation as in Example 1, except for using 100 parts by mass of the respective polymer compositions having compositions of Polymer Blend Examples 1 to 5 shown in Table 4 in place of 100 parts by mass of the hydrogenated block copolymer composition of Example 1. The evaluation results of the each obtained pressure-sensitive adhesive composition and pressure-sensitive adhesive tape are shown in Table 2.

Example 16

A pressure-sensitive adhesive composition and a pressure-sensitive adhesive tape were fabricated, respectively, by carrying out the same operation as in Example 1, except for using the same tackifier of Example 1 in an amount of 100 parts by mass instead of 140 parts by mass. The evaluation results of the each obtained pressure-sensitive adhesive composition and pressure-sensitive adhesive tape are shown in Table 2.

Example 20

A pressure-sensitive adhesive composition and a pressure-sensitive adhesive tape were fabricated, respectively, by carrying out the same operation as in Example 1, except for using the same tackifier in an amount of 100 parts by mass instead of 140 parts by mass and using the hydrogenated block copolymer composition of Production Example 19 in place of the hydrogenated block copolymer composition of Production Example 1. The evaluation results of the each obtained pressure-sensitive adhesive composition and pressure-sensitive adhesive tape are shown in Table 2.

Example 21

A homogenous hot melt pressure-sensitive adhesive composition was obtained by the above-mentioned preparation method of the pressure-sensitive adhesive composition (Blend β) using the hydrogenated block copolymer composition of Production Example 1. Further, a pressure-sensitive adhesive tape was obtained by the above-mentioned preparation method of a pressure-sensitive adhesive tape. Physical properties of the above-mentioned pressure-sensitive adhesive composition were measured by using these pressure-sensitive adhesive composition and pressure-sensitive adhesive tape. These results are shown in Table 3.

Examples 22 to 26, Comparative Example 8

Pressure-sensitive adhesive compositions and pressure-sensitive adhesive tapes were fabricated, and their physical properties were evaluated, by carrying out the same operation as in Example 21, except for using the hydrogenated block copolymer compositions of Production Examples 4, 6, 19 to 21 and 23 in place of the hydrogenated block copolymer composition of Production Example 1. These results are shown in Table 3. Here, in the case where the torque did not become stabilized even after the kneading was carried out for 30 min, the kneading was carried out until the torque became stabilized.

Examples 27 to 31

Pressure-sensitive adhesive compositions and pressure-sensitive adhesive tapes were fabricated, respectively, by carrying out the same operation as in Example 1, except for using 100 parts by mass of the respective polymer compositions obtained by mixing compositions of Polymer Blend Examples 6 to 10 shown in Table 4 in place of 100 parts by mass of the hydrogenated block copolymer composition of Example 21. The evaluation results of the each obtained pressure-sensitive adhesive composition and pressure-sensitive adhesive tape are shown in Table 3.

Examples 32 to 35

Homogenous hot melt pressure-sensitive adhesive compositions were obtained by the above-mentioned preparation method of the pressure-sensitive adhesive composition (Blend γ) so as to have the compositions of Blend Examples 11 to 14 shown in Table 4. Further, pressure-sensitive adhesive tapes were obtained by the above-mentioned preparation method of a pressure-sensitive adhesive tape. Physical properties of the above-mentioned pressure-sensitive adhesive compositions were measured by using these pressure-sensitive adhesive compositions and pressure-sensitive adhesive tapes. These results are shown in Table 5.

Here, the structures of the component (A) and the component (B) shown in Table 1 are structures estimated from the preparation method.

Numerical values in Table 4 indicate the number of parts by mass. The respective components in Table are as follows.

None of (P1) to (P3) below are hydrogenated.

(P1) Non-hydrogenated styrene-isoprene-based block copolymers (degree of hydrogenation: 0%)

- (P1-1) D1161 (manufactured by Krayton Polymers LLC) SI/SIS, styrene content: 16 mass %, SI content: 20 mass %
- (P1-2) Quintac 3433N (manufactured by Zeon Corp.) SI/SIS, styrene content: 15 mass %, SI content: 78 mass %
- (P1-3) Quintac 3460 (manufactured by Zeon Corp.) $SI(SI)_3X$, styrene content: 25 mass %, SI content: 30 mass %

*In the above formulae, “S” denotes a styrene block; “I” denotes an isoprene block; and “X” denotes a coupling agent residue.

(P2) Non-hydrogenated styrene-butadiene-based block copolymer (degree of hydrogenation: 0%)

- (P2-1) D1102 (manufactured by Krayton Polymers LLC)

(P3) Modified styrene-butadiene-based block copolymers (P3-1) Tufprene T912 (manufactured by Asahi Kasei Chemicals Corp.)

*In the above formulae, "S" denotes a styrene block; and "B" denotes a butadiene block.

(T) Tackifiers (T1) Hydrogenated petroleum resin Arkon P100 (manufactured by Arakawa Chemical Industries Ltd.)

(T2) Hydrogenated petroleum resin Arkon M100 (manufactured by Arakawa Chemical Industries Ltd.)

(T3) Rosin ester resin Super Ester A100 (manufactured by Arakawa Chemical Industries Ltd.)

(O) Oil (O1) Paraffinic oil PW-90 (manufactured by Idemitsu Kosan Co., Ltd.)

TABLE 1

| | | Product Example | | | | | | | |
|---|---|---|---|---|---|---|---|---|---|
| | | 1 | 2 | | 3 | 4 | 5 | 6 | 7 |
| Cyclohexane (g) | | 5960 | | | | | | | |
| TMEDA (g) | | 2.5 | 3.8 | 1.4 | 2.3 | 4.1 | 3.1 | 2.9 | 2.9 |
| n-Butyllithium (g) | | 3.79 | 5.25 | 2.54 | 3.56 | 5.57 | 4.44 | 4.26 | 4.26 |
| Styrene (g) | | 430 | 490 | 250 | 450 | 480 | 450 | 580 | 580 |
| 1.3-Butadiene (g) | | 2600 | 2540 | 2540 | 2570 | 2540 | 2570 | 2460 | 2460 |
| Styrene (g) | | — | — | 240 | — | — | — | — | — |
| Coupling Agent (g) | | 4.84 | — | — | 3.40 | 6.09 | 6.23 | 5.34 | 5.34 |
| Methanol (g) | | 0.70 | 2.17 | 0.81 | 0.80 | 1.31 | 0.76 | 0.83 | 0.83 |
| Number of Locations of Monomer Addition | | 3 | 3 | 3 | 3 | 3 | 3 | 2 | 2 |
| Difference between Maximum Value and Minimum Value of Temperature of Solution during Polymerization (° C.) | | 3.2 | 3.8 | 3.8 | 3.5 | 14.0 | 3.9 | 7.0 | 31.0 |
| H/D of Hydrogenation Reactor | | 5.2 | 5.2 | 5.2 | 5.2 | 5.2 | 5.2 | 5.2 | 5.2 |
| Difference between Maximum Value and Minimum Value of Temperature of Solution during Hydrogenation (° C.) | | 3.2 | 4.2 | 4.1 | 3.7 | 5.0 | 4.8 | 4.5 | 4.4 |
| Content of Vinyl Aromatic Monomer Unit (mass %) | | 14 | 16 | | 15 | 16 | 15 | 19 | 19 |
| Amount of Vinyl Bonds before Hydrogenation of Conjugated Diene Monomer Unit (mol %) | | 38 | 40 | | 33 | 40 | 41 | 45 | 42 |
| Component (A) | Structure | Ar-D | Ar-D | — | Ar-D | Ar-D | Ar-D | Ar-D | Ar-D |
| | Content (mass %) | 48 | 40 | — | 60 | 56 | 43 | 49 | 49 |
| | Weight-Average Molecular Weight | 115000 | 75000 | — | 125000 | 70000 | 93000 | 95000 | 95000 |
| Component (B) | Structure | $(Ar\text{-}D)_2X$ | — | Ar-D-Ar | $(Ar\text{-}D)_2X$ | $(Ar\text{-}D)_2X$ | $(Ar\text{-}D)_2X$ | $(Ar\text{-}D)_2X$ | $(Ar\text{-}D)_2X$ |
| | Content (mass %) | 52 | — | 60 | 40 | 44 | 57 | 51 | 51 |
| | Weight-Average Molecular Weight | 228000 | — | 200000 | 241000 | 141000 | 201000 | 201000 | 201000 |
| Maximum Value of Tan δ | | 1.5 | 1.2 | | 1.3 | 0.91 | 1.2 | 0.85 | 0.65 |
| Temperature at Which Tan δ Has Maximum Value (° C.) | | −61 | −60 | | −61 | −61 | −60 | −58 | −62 |
| Hydrogenation Rate of Conjugated Diene Monomer Unit (mol %) | | 52 | 43 | | 42 | 50 | 48 | 54 | 54 |
| Hydrogenation Rate of Vinyl Bonds in Conjugated Diene Monomer Unit (mol %) | | 100 | 85 | | 98 | 100 | 90 | 100 | 100 |
| SP Value of Middle Block | | 17.05 | 17.10 | | 17.17 | 17.06 | 17.06 | 17.00 | 17.02 |
| SP Value of Polymer | | 17.38 | 17.47 | | 17.50 | 17.43 | 17.41 | 17.46 | 17.47 |

| | Product Example | | | | | | | |
|---|---|---|---|---|---|---|---|---|
| | 8 | 9 | 10 | 11 | 12 | 13 | 14 | 15 |
| Cyclohexane (g) | 5960 | | | | | | | |
| TMEDA (g) | 2.6 | 2.5 | 3.1 | 4.6 | 2.6 | 2.7 | 2.4 | 13.2 |
| n-Butyllithium (g) | 3.89 | 3.79 | 4.47 | 6.14 | 3.91 | 4.06 | 3.65 | 16.03 |
| Styrene (g) | 820 | 390 | 450 | 450 | 460 | 490 | 490 | 430 |
| 1.3-Butadiene (g) | 2230 | 2630 | 2570 | 2570 | 2570 | 2540 | 2540 | 2600 |
| Styrene (g) | — | — | — | — | — | — | — | — |
| Coupling Agent (g) | 5.28 | 5.05 | 4.97 | 7.57 | 5.62 | 5.04 | — | 19.10 |
| Methanol (g) | 0.67 | 0.66 | 0.98 | 1.31 | 0.63 | 0.79 | 1.37 | 3.93 |
| Number of Locations of Monomer Addition | 2 | 3 | 3 | 3 | 2 | 3 | 3 | 3 |
| Difference between Maximum Value and Minimum Value of Temperature of Solution during Polymerization (° C.) | 34.0 | 3.1 | 3.9 | 3.9 | 14.0 | 4.5 | 10.2 | 5.0 |
| H/D of Hydrogenation Reactor | 5.2 | 5.2 | 5.2 | 5.2 | 5.2 | 5.2 | 5.2 | 5.2 |
| Difference between Maximum Value and Minimum Value of Temperature of Solution during Hydrogenation (° C.) | 4.3 | 3.1 | 4.9 | 4.9 | 4.1 | 3.1 | 4.1 | 3.9 |

TABLE 1-continued

| | | | | | | | | | |
|---|---|---|---|---|---|---|---|---|---|
| Content of Vinyl Aromatic Monomer Unit (mass %) | | 27 | 13 | 15 | 15 | 15 | 16 | 16 | 14 |
| Amount of Vinyl Bonds before Hydrogenation of Conjugated Diene Monomer Unit (mol %) | | 38 | 35 | 36 | 38 | 38 | 32 | 35 | 40 |
| Component (A) | Structure | Ar-D | Ar-D | Ar-D | Ar-D | Ar-D | Ar-D | Ar-D | Ar-D |
| | Content (mass %) | 45 | 46 | 55 | 50 | 42 | 50 | 100 | 52 |
| | Weight-Average Molecular Weight | 102000 | 110000 | 90000 | 62000 | 110000 | 105000 | 120000 | 22000 |
| Component (B) | Structure | $(Ar\text{-}D)_2X$ | $(Ar\text{-}D)_2X$ | $(Ar\text{-}D)_2X$ | $(Ar\text{-}D)_2X$ | $(Ar\text{-}D)_2X$ | $(Ar\text{-}D)_2X$ | — | $(Ar\text{-}D)_2X$ |
| | Content (mass %) | 55 | 54 | 45 | 50 | 58 | 50 | 0 | 48 |
| | Weight-Average Molecular Weight | 208000 | 210000 | 180000 | 125000 | 221000 | 211000 | — | 40000 |
| Maximum Value of Tan δ | | 0.51 | 1.8 | 1.0 | 1.0 | 0.81 | 1.2 | 0.98 | 1.1 |
| Temperature at Which Tan δ Has Maximum Value (° C.) | | −60 | −62 | −62 | −61 | −55 | −40 | −62 | −60 |
| Hydrogenation Rate of Conjugated Diene Monomer Unit (mol %) | | 41 | 50 | 50 | 51 | 0 | 97 | 50 | 43 |
| Hydrogenation Rate of Vinyl Bonds in Conjugated Diene Monomer Unit (mol %) | | 85 | 100 | 100 | 100 | 0 | 100 | 100 | 85 |
| SP Value of Middle Block | | 17.13 | 17.09 | 17.08 | 17.06 | 17.39 | 16.67 | 17.09 | 17.10 |
| SP Value of Polymer | | 17.74 | 17.38 | 17.43 | 17.41 | 17.69 | 17.11 | 17.46 | 17.42 |

| | | Product Example | | | | | | | |
|---|---|---|---|---|---|---|---|---|---|
| | | 16 | 17 | 18 | 19 | 20 | 21 | 22 | 23 |
| Cyclohexane (g) | | 5960 | | | | | | | |
| TMEDA (g) | | 2.2 | 2.6 | 4.3 | 2.4 | 3.2 | 3.4 | 3.7 | 0.82 |
| n-Butyllithium (g) | | 3.44 | 3.84 | 3.86 | 4.26 | 5.16 | 5.23 | 5.18 | 3.93 |
| Styrene (g) | | 1010 | 890 | 454 | 484 | 607 | 762 | 917 | 454 |
| 1.3-Butadiene (g) | | 2050 | 2170 | 2570 | 2542 | 2428 | 2285 | 2141 | 2570 |
| Styrene (g) | | — | — | — | — | — | — | — | — |
| Coupling Agent (g) | | 4.10 | 4.55 | 5.24 | 2.78 | 3.36 | 2.922 | 3.83 | 4.85 |
| Methanol (g) | | 0.66 | 0.76 | 0.67 | 1.09 | 1.38 | 1.51 | 1.49 | 0.76 |
| Number of Locations of Monomer Addition | | 1 | 1 | 3 | 3 | 3 | 2 | 1 | 1 |
| Difference between Maximum Value and Minimum Value of Temperature of Solution during Polymerization (° C.) | | 40.0 | 45.0 | 4 | 23 | 10 | 34 | 35 | 35 |
| H/D of Hydrogenation Reactor | | 2.2 | 2.2 | 5.2 | 5.2 | 5.2 | 5.2 | 2.2 | 2.2 |
| Difference between Maximum Value and Minimum Value of Temperature of Solution during Hydrogenation (° C.) | | 25.0 | 22.0 | 5 | 5 | 5 | 4.3 | 41 | 40 |
| Content of Vinyl Aromatic Monomer Unit (mass %) | | 33 | 29 | 15 | 16 | 20 | 25 | 30 | 15 |
| Amount of Vinyl Bonds before Hydrogenation of Conjugated Diene Monomer Unit (mol %) | | 41 | 38 | 60 | 31 | 33 | 35 | 38 | 20 |
| Component (A) | Structure | Ar-D | Ar-D | Ar-D | Ar-D | Ar-D | Ar-D | Ar-D | Ar-D |
| | Content (mass %) | 52 | 52 | 45 | 65 | 65 | 65 | 70 | 50 |
| | Weight-Average Molecular Weight | 115000 | 110000 | 110000 | 98000 | 75000 | 71000 | 70000 | 110000 |
| Component (B) | Structure | $(Ar\text{-}D)_2X$ | $(Ar\text{-}D)_2X$ | $(Ar\text{-}D)_2X$ | $(Ar\text{-}D)_2X$/ $(Ar\text{-}D)_3X$/ $(Ar\text{-}D)_4X$ | $(Ar\text{-}D)_2X$/ $(Ar\text{-}D)_3X$/ $(Ar\text{-}D)_4X$ | $(Ar\text{-}D)_2X$/ $(Ar\text{-}D)_3X$/ $(Ar\text{-}D)_4X$ | $(Ar\text{-}D)_2X$ | $(Ar\text{-}D)_2X$ |
| | Content (mass %) | 48 | 48 | 55 | 6.6/ 14.5/ 14.6 | 7/ 13.5/ 14.5 | 5/ 16/ 14 | 30 | 50 |
| | Weight-Average Molecular Weight | 218000 | 221000 | 220000 | 210000/ 300000/ 370000 | 150000/ 210000/ 280000 | 140000/ 200000/ 280000 | 140000 | 220000 |
| Maximum Value of Tan δ | | 0.29 | 0.69 | 1.5 | 0.94 | 0.91 | 0.5 | 0.34 | 0.35 |
| Temperature at Which Tan δ Has Maximum Value (° C.) | | −60 | −60 | −50 | −64 | −62 | −61 | −59 | −43 |
| Hydrogenation Rate of Conjugated Diene Monomer Unit (mol %) | | 46 | 46 | 75 | 53 | 51 | 43 | 58 | 83 |
| Hydrogenation Rate of Vinyl Bonds in Conjugated Diene Monomer Unit (mol %) | | 85 | 90 | 98 | 92 | 93 | 85 | 90 | 100 |
| SP Value of Middle Block | | 17.07 | 17.09 | 16.74 | 17.06 | 17.08 | 17.13 | 16.98 | 17.14 |
| SP Value of Polymer | | 17.84 | 17.76 | 17.13 | 17.44 | 17.54 | 17.7 | 17.71 | 17.47 |

TABLE 2

| | Example 1 | Example 2 | Example 3 | Example 4 | Example 5 | Example 6 | Example 7 | Example 8 | Example 9 |
|---|---|---|---|---|---|---|---|---|---|
| Block Copolymer Composition | Production Example 1 | Production Example 2 | Production Example 3 | Production Example 4 | Production Example 5 | Production Example 6 | Production Example 7 | Production Example 8 | Production Example 9 |
| Blend | — | — | — | — | — | — | — | — | — |
| Holding power | ○ | ○ | ○ | Δ | ○ | ◎ | ◎ | ◎ | Δ |
| Probe Tack | ◎ | ◎ | ◎ | ◎ | ◎ | ○ | ○ | Δ | ◎ |
| Adhesive power | ○ | ○ | ○ | ○ | ○ | ○ | ○ | ○ | ○ |
| Melt Viscosity | ○ | ○ | ○ | ◎ | ○ | ○ | ○ | ○ | ○ |
| Penetration | ◎ | ◎ | ◎ | ◎ | ◎ | ◎ | ○ | ○ | ◎ |

| | Example 10 | Example 11 | Example 12 | Example 13 | Example 14 | Example 15 | Example 16 | Example 17 | Example 18 |
|---|---|---|---|---|---|---|---|---|---|
| Block Copolymer Composition | Production Example 10 | Production Example 11 | Production Example 18 | Production Example 19 | — | — | Production Example 1 | — | — |
| Blend | — | — | — | — | Blend Example 1 | Blend Example 2 | — | Blend Example 3 | Blend Example 4 |
| Holding power | Δ | Δ | ○ | ○ | Δ | Δ | ○ | Δ | Δ |
| Probe Tack | ◎ | ◎ | Δ | ◎ | ◎ | ◎ | ◎ | ◎ | ◎ |
| Adhesive power | ○ | Δ | ○ | ○ | ○ | ○ | ○ | ○ | ○ |
| Melt Viscosity | ◎ | ◎ | ○ | ◎ | ◎ | ◎ | Δ | ◎ | ◎ |
| Penetration | ◎ | ◎ | Δ | ◎ | ◎ | ◎ | ◎ | ◎ | ◎ |

| | Example 19 | Example 20 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Block Copolymer Composition | — | Production Example 19 | Production Example 12 | Production Example 13 | Production Example 14 | Production Example 15 | Production Example 16 | Production Example 17 | Production Example 23 |
| Blend | Blend Example 5 | — | — | — | — | — | — | — | — |
| Holding power | ○ | ○ | x | ○ | x | x | ◎ | ◎ | ○ |
| Probe Tack | ◎ | ◎ | x | ◎ | x | Δ | x | x | x |
| Adhesive power | ○ | ○ | x | ○ | x | x | ○ | ○ | ○ |
| Melt Viscosity | ◎ | ○ | ○ | x | ◎ | ◎ | ○ | ○ | x |
| Penetration | ◎ | ◎ | ○ | Δ | ◎ | ◎ | x | x | x |

TABLE 3

| | Example 21 | Example 22 | Example 23 | Example 24 | Example 25 | Example 26 | Example 27 | Example 28 | Example 29 | Example 30 | Example 31 | Comparative Example 8 |
|---|---|---|---|---|---|---|---|---|---|---|---|---|
| Block Copolymer Composition | Production Example 1 | Production Example 4 | Production Example 6 | Production Example 19 | Production Example 20 | Production Example 21 | — | — | — | — | — | Production Example 23 |
| Blend | — | — | — | — | — | — | Blend Example 6 | Blend Example 7 | Blend Example 8 | Blend Example 9 | Blend Example 10 | |
| Holding power | ○ | Δ | ○ | ○ | ○ | ○ | Δ | ○ | ◎ | Δ | ○ | ○ |
| Ball Tack | ○ | ○ | Δ | ○ | ○ | Δ | ○ | ○ | ○ | ○ | ○ | x |
| Adhesive power | ○ | ○ | ○ | ○ | ○ | ○ | ○ | ○ | ○ | ○ | ○ | x |
| Melt Viscosity | Δ | ○ | Δ | Δ | ○ | ○ | ○ | ○ | ○ | ○ | ○ | x |
| Penetration | ○ | ○ | ○ | ○ | ○ | ○ | ○ | ○ | ○ | ○ | ○ | x |

TABLE 4

| | Blend Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Production Example 1 | 50 | 70 | | | | 30 | 70 | | | | | | | |
| Production Example 19 | | | 30 | 75 | 80 | | | 50 | 50 | 80 | 80 | | 50 | 100 |
| Production Example 20 | | | | | | | | | | | | 100 | | |
| Production Example 22 | | | | | | | | 50 | | | | | | |
| (P1-1) | 50 | | 70 | | | 70 | | | 50 | | | | | |
| (P1-2) | | 30 | | 25 | | | 30 | | | 20 | | | | |
| (P1-3) | | | | | 20 | | | | | | | | | |
| (P2-1) | | | | | | | | | | | | | 50 | |
| (P3-1) | | | | | | | | | | | 20 | | | |
| (T1) | | | | | | | | | | | | 250 | | |
| (T2) | | | | | | | | | | | 230 | | 220 | |
| (T3) | | | | | | | | | | | | | | 180 |
| (O1) | | | | | | | | | | | 100 | 100 | 90 | 70 |

TABLE 5

| Blend | Example 32 Blend Example 11 | Example 33 Blend Example 12 | Example 34 Blend Example 13 | Example 35 Blend Example 14 |
|---|---|---|---|---|
| Holding power | ○ | ○ | ○ | Δ |
| Probe Tack | ○ | ○ | ○ | ○ |
| Adhesive power | ○ | ○ | ○ | ○ |
| Penetration | ○ | ○ | ○ | ○ |

INDUSTRIAL APPLICABILITY

The pressure-sensitive adhesive composition according to the present invention can be utilized for various types of pressure-sensitive adhesive tapes, pressure-sensitive adhesive sheets, pressure-sensitive adhesive films, pressure-sensitive adhesive labels, pressure-sensitive thin plates, pressure-sensitive sheets, surface protection sheets, surface protection films, sanitary materials, backside adhesives for fixing various types of light-weight plastic molds, backside adhesives for fixing carpets, backside adhesives for fixing tiles, adhesives and the like, and has the industrial applicability as a pressure-sensitive adhesive particularly for pressure-sensitive adhesive tapes, pressure-sensitive adhesive sheets, pressure-sensitive adhesive films, pressure-sensitive adhesive labels, surface protection sheets, surface protection films, and sanitary materials.

The present application is based on a Japanese Patent Application (Japanese Patent Application No. 2014-103809), filed with Japan Patent Office on May 19, 2014, the entire contents of which are hereby incorporated by reference.

The invention claimed is:

1. A hydrogenated block copolymer composition, comprising:

a component (A) comprising only one polymer block comprising a vinyl aromatic hydrocarbon as a primary component and at least one polymer block comprising a conjugated diene compound as a primary component, and having a weight-average molecular weight of 30,000 or higher and 500,000 or lower, and a component (B) comprising at least two polymer blocks comprising a vinyl aromatic hydrocarbon as a primary component and at least one polymer block comprising a conjugated diene compound as a primary component, and having a weight-average molecular weight of 50,000 or higher and 1,000,000 or lower;

wherein the composition satisfies requirements (a) to (c) below:

(a) a total degree of hydrogenation H (%) of unsaturated double bonds based on the conjugated diene compound is 5% or higher and lower than 80%;

(b) a maximum value of a loss factor tan δ at from −100° C. to 0° C. is 0.4 to 4.0; and (c) a ratio between the weight-average molecular weight of the component (A) and the weight-average molecular weight of the component (B) (the weight-average molecular weight of the component (B)/the weight-average molecular weight of the component (A)) is from 1.3 to 10.

2. The hydrogenated block copolymer composition according to claim 1, wherein a content of the component (A) is 20 mass % or more and 90 mass % or less, and the content of the component (B) is 10 mass % or more and 80 mass % or less.

3. The hydrogenated block copolymer composition according to claim 1, wherein an SP value is 17.2 $(MPa)^{1/2}$ or higher and 17.7 $(MPa)^{1/2}$ or lower.

4. The hydrogenated block copolymer composition according to claim 1, wherein an SP value of the polymer block comprising a conjugated diene compound as a primary component is 16.8 $(MPa)^{1/2}$ or higher and 17.5 $(MPa)^{1/2}$ or lower.

5. The hydrogenated block copolymer composition according to claim 1, wherein the weight-average molecular weight of the component (B) is 140,000 or higher and 600,000 or lower.

6. The hydrogenated block copolymer composition according to claim 1, wherein the component (B) comprises two polymer blocks comprising a vinyl aromatic hydrocarbon as a primary component and at least one polymer block comprising a conjugated diene compound as a primary component.

7. The hydrogenated block copolymer composition according to claim 1, wherein the weight-average molecular weight of the component (B) is 200,000 or higher and 600,000 or lower.

8. The hydrogenated block copolymer composition according to claim 1, wherein the conjugated diene compound is butadiene.

9. The hydrogenated block copolymer composition according to claim 1, wherein a content of a vinyl aromatic hydrocarbon monomer unit in the hydrogenated block copolymer composition is 5 mass % or higher and lower than 35 mass %.

10. The hydrogenated block copolymer composition according to claim 1, wherein a content of a vinyl aromatic hydrocarbon monomer unit in the hydrogenated block copolymer composition is 5 mass % or higher and lower than 20 mass %.

11. The hydrogenated block copolymer composition according to claim 1, wherein the maximum value of the loss factor tan δ is from 0.7 to 1.6.

12. The hydrogenated block copolymer composition according to claim 1, wherein the maximum value of the loss factor tan δ is from 0.9 to 1.6.

13. The hydrogenated block copolymer composition according to claim 1, wherein a temperature at which the loss factor tan δ has the maximum value is −75° C. or higher and −50° C. or lower.

14. The hydrogenated block copolymer composition according to claim 1, wherein the weight-average molecular weight of the component (A) is 70,000 or higher and 300,000 or lower.

15. A pressure-sensitive adhesive composition comprising the hydrogenated block copolymer composition according to claim 1, further comprising with respect to total 100 parts by mass of polymers contained in the pressure-sensitive adhesive composition:

from 20 to 500 parts by mass of a tackifier, and from 0 to 300 parts by mass of a softener.

16. The pressure-sensitive adhesive composition according to claim 15, further comprising a vinyl aromatic elastomer.

17. The pressure-sensitive adhesive composition according to claim 16, wherein the vinyl aromatic elastomer comprises at least one polymer block comprising a vinyl aromatic hydrocarbon as a primary component and at least one polymer block comprising a conjugated diene compound as a primary component, a maximum value of a loss factor tan δ at from −100° C. to 0° C. is lower than 0.4, and a degree of hydrogenation H (%) of unsaturated double bonds based on the conjugated diene compound is from 5 to 90%.

18. The pressure-sensitive adhesive composition according to claim 15, further comprising a conjugated diene-based synthetic rubber.

19. The pressure-sensitive adhesive composition according to claim 15, further comprising a natural rubber.

20. A pressure-sensitive adhesive composition comprising (i) a hydrogenated block copolymer composition comprising:

a component (A) comprising at least one polymer block comprising a vinyl aromatic hydrocarbon as a primary component and at least one polymer block comprising a conjugated diene compound as a primary component, and having a weight-average molecular weight of 30,000 or higher and 500,000 or lower, and a component (B) comprising at least two polymer blocks comprising a vinyl aromatic hydrocarbon as a primary component and at least one polymer block comprising a conjugated diene compound as a primary component, and having a weight-average molecular weight of 50,000 or higher and 1,000,000 or lower;

wherein the composition satisfies requirements (a) to (c) below:

(a) a total degree of hydrogenation H (%) of unsaturated double bonds based on the conjugated diene compound is 5 to 90%;

(b) a maximum value of a loss factor tan δ at from −100° C. to 0° C. is 0.4 to 4.0; and (c) a ratio between the weight-average molecular weight of the component (A) and the weight-average molecular weight of the component (B) (the weight-average molecular weight of the component (B)/the weight-average molecular weight of the component (A)) is from 1.3 to 10;

(ii) with respect to total 100 parts by mass of polymers contained in the pressure-sensitive adhesive composition:

from 20 to 500 parts by mass of a tackifier, and from 0 to 300 parts by mass of a softener; and (iii) a natural rubber.

* * * * *